United States Patent [19]

Luetkens, Jr. et al.

[11] Patent Number: 5,043,308

[45] Date of Patent: * Aug. 27, 1991

[54] CRYSTALLINE RARE EARTH ALUMINUM BORATES

[75] Inventors: Melvin L. Luetkens, Jr., Batavia; Larry C. Satek, Wheaton, both of Ill.

[73] Assignee: Amoco Corporation, Chicago, Ill.

[ * ] Notice: The portion of the term of this patent subsequent to Feb. 5, 2008 has been disclaimed.

[21] Appl. No.: 330,418

[22] Filed: Mar. 29, 1989

[51] Int. Cl.$^5$ ............... B01J 21/02; C01F 17/00; C01B 35/12

[52] U.S. Cl. .................. 502/204; 423/263; 423/277; 423/279; 585/443; 585/658; 585/444; 585/486; 558/320; 558/327; 252/301.4 R

[58] Field of Search ............ 423/277–279, 423/213.2, 600, 263; 502/202, 204, 207; 585/443, 658, 444, 486; 558/320, 327; 252/301.4 R

[56] References Cited

U.S. PATENT DOCUMENTS

| | | | |
|---|---|---|---|
| 2,118,143 | 5/1938 | Benner et al. | 423/279 |
| 3,057,677 | 10/1962 | Ballman | 423/277 |
| 3,080,242 | 3/1963 | Berry | 423/277 |
| 3,350,166 | 10/1967 | Alley et al. | 423/279 |
| 3,856,702 | 12/1974 | McArthur | 423/279 |
| 3,856,705 | 12/1974 | McArthur | 423/279 |
| 3,860,692 | 1/1975 | Nies et al. | 423/277 |
| 4,024,171 | 5/1977 | McArthur | 423/213.2 |
| 4,246,246 | 1/1981 | Nakamura | 423/279 |
| 4,645,753 | 2/1987 | Zletz et al. | 423/279 |
| 4,656,016 | 4/1987 | Taramasso et al. | 423/277 |
| 4,729,979 | 3/1988 | Zletz | 423/279 |
| 4,766,102 | 8/1988 | Satek et al. | 423/600 |
| 4,767,738 | 8/1988 | Melquist et al. | 423/277 |
| 4,990,480 | 2/1991 | Luetkens, Jr. et al. | 502/204 |

FOREIGN PATENT DOCUMENTS 1072933 6/1967 United Kingdom ............... 423/279

OTHER PUBLICATIONS

Ballman, A. A., "A New Series of Synthetic Borates Isostructural with the Carbonate Mineral Huntingtonite", The American Mineralogist 47 (1962), pp. 1380–1383.

Pashkova et al., "A New Series of Double Metaborates", Dokl. Akad. Nauk. SSSR 258 (1981) pp. 103–106.

Bither et al., "MBO$_3$ Calcite-Type Borates of Al, Ga, Tl, Rh", J. Solid State Chem., vol. 6, No. 4 (1973), pp. 502–508.

Leonyuk et al., "Neodymium Incorporation into Y–Al Borate Crystals in Preparation from Solutions in Molten Potassium Trimolybdate", Krystall und Technik, vol. 14, No. 1 (1979), pp. 47–50.

Scholze, V. H., "Uber Aluminium borate", Z. anorg. allg. Chemie, vol. 284 (1956), pp. 272–277.

Primary Examiner—R. Bruce Breneman
Attorney, Agent, or Firm—Frederick S. Jerome; William H. Magidson; Ralph C. Medhurst

[57] ABSTRACT

The preparation, structure, and properties of solid inorganic materials containing at least one rare earth element, aluminum, boron and oxygen are described. Also described is the use of such materials in catalytic compositions for the conversion of organic compounds. In particular, new materials comprising crystalline $LnAl_{1.67-0.67X}(B_4O_{10})O_X$ where Ln is at least one Group IIIB element ion having effective ionic radii less than about 0.98 Angstroms at valence 3+ and coordination number VI, and X is a number ranging from 0 to 1, having a characteristic X-ray diffraction pattern are described as well as the use of such materials in various catalyzed processes including oxidative dehydrogenation of hydrocarbons and oxygen-containing hydrocarbons, dehydrogenation to functionalize alkylaromatic compounds, and ammoxidation of alkylaromatic compounds. Also, these new crystalline rare earth aluminum borates exhibit a variety of physical properties that make their use as optical materials attractive, including uses for optical frequency conversion, fluorescence, and laser materials.

43 Claims, No Drawings

CRYSTALLINE RARE EARTH ALUMINUM BORATES

BACKGROUND OF THE INVENTION

The present invention relates to crystalline inorganic materials containing at least one rare earth element, aluminum, boron and oxygen. In particular, new materials comprising crystalline $LnAl_{1.67+0.67X}(B_4O_{10})O_X$ where Ln is at least one rare earth element ion having effective ionic radii less than about 0.98 Angstroms at valence 3+ and coordination number VI, and X is a number ranging from 0 to 1, having a characteristic X-ray diffraction pattern are described as well as the use of such materials in various catalyzed processes including partial oxidation and oxidative dehydrogenation of hydrocarbons and oxygen-containing hydrocarbons, dehydrogenation to functionalize alkylaromatic compounds, dealkylation of alkylaromatic compounds, and ammoxidation of alkylaromatic compounds. Also these new crystalline rare earth aluminum borates exhibit a variety of physical properties that make their use as optical materials attractive, including uses for optical frequency conversion, fluorescence, and laser materials.

The use of an active metallo element or a supported metallo element composition containing aluminum and boron as a conversion catalyst is known in the art. U.S. Pat. No. 3,883,442 to McArthur is illustrative of prior art disclosing the superiority of a supported active metal catalyst to resist shrinkage at high temperatures (up to 1600° C.) by stabilization of a preformed alumina catalyst support. McArthur states stabilization was achieved by impregnating an alumina support with a solution of a boron compound which is thermally decomposable to $B_2O_3$, followed by drying and calcining of the impregnated support at temperatures below about 1500° C., but sufficiently high to decompose the boron compound. McArthur also discloses that the most commonly used technique of preparing a supported metallo element catalyst involved, following calcination, impregnating in conventional manner the alumina support material containing some retained $B_2O_3$ with a solution of the desired metal salt, preferably those that are thermally decomposable to give the corresponding metal oxides and/or sulfides, and calcining the salt-impregnated support to convert the impregnated salt to the active catalytic form. McArthur neither discloses nor suggests a mixed oxide composition of a rare-earth element, aluminum, and boron.

In U.S. Pat. No. 3,954,670 to Pine, a boria-alumina based catalyst is disclosed in the combination of a metallo element and a boria-alumina catalyst support material prepared by hydrolysis of a mixture of aluminum alkoxide and boron alkoxide in the presence of water at a temperature in the range of 20° to 100° C. The disclosed catalyst compositions, said to be useful for desulfurization, denitrogenation, reforming and other hydrocarbon conversion processes, included rare earths such as cesium, lanthanum, neodymium, etc. as metallo elements in combinations with the boria-alumina catalyst composition disclosed in Pine and, optionally, a crystalline aluminosilicate zeolite with or without rare earth elements. However, Pine neither discloses nor suggests any crystalline mixed oxide composition of a rare-earth element, aluminum, and boron.

Zletz in U.S. Pat. No. 4,729,979, which is hereby incorporated by reference, discusses the characteristics of a good catalyst and/or catalyst support and a new crystalline copper aluminum borate characterized by a specific X-ray diffraction pattern, surface area and pore volume which is at least partially reducible with hydrogen at a temperature no more than 350° C. to a composition containing zero valent copper and $Al_4B_2O_9$. Satek in U.S. Pat. No. 4,590,324, which is hereby incorporated by reference, discusses using the new crystalline copper aluminum borate as a catalyst to dehydrogenate alkylaromatics to alkenylaromatics. Zletz et al. in U.S. Pat. No. 4,645,753, which is hereby incorporated by reference, discusses doping the new crystalline copper aluminum borate to contain an alkali metal or alkaline earth metal element for use as a catalyst to dehydrogenate alkylaromatics to alkenylaromatics. The Zletz, Satek, and Zletz et al. patents alone or in combination neither disclose nor suggest a mixed oxide composition of aluminum, boron, and a metallo element without copper. Furthermore, these patents disclose crystalline copper aluminum borate having significant X-ray diffraction lines which are substantially different from X-ray diffraction patterns for crystalline materials of the present invention.

A. A. Ballman discloses the preparation of rare earth aluminum borates from a molten solution with the general formula $RAl_3B_4O_{12}$ where R was yttrium, neodymium, samarium, europium, gadolinium, terbium, dysprosium, holmium, ytterbium and erbium in *American Mineralogist* 47, 1380-1383, (1962), "A New Series of Synthetic Borates Isostructural with the Carbonate Mineral Huntite" which is hereby incorporated by reference. A molten solution of potassium sulfate and molybdic anhydride (1:3 mole ratio) or lead fluoride and boric oxide (1:3 mole ratio) were used to dissolve the component oxides and produced single crystals ranging in size from about 0.1-10 mm when slowly cooled from 1150° to 900° C. The rare earth aluminum borates produced by the indicated route are believed to be well-defined, dense crystalline particles which have an extremely low surface area due to heating a mixture of oxides to a temperature of 1150° C. Ballman neither discloses nor suggests a mixed oxide composition of aluminum, boron, and a rare earth element having an aluminum to boron ratio less than $\frac{3}{4}$. Furthermore, the crystalline compounds disclosed by Ballman are characterized by having significant X-ray diffraction lines which are substantially different from X-ray diffraction patterns for crystalline materials of the present invention.

Kong Hua-shuang, Zhang Shou-qing, He Chung-fan and Zhang Dao-biao disclose the preparation of $NdAl_2(B_4O_{10})O_{0.5}$ crystals grown from solvent in *Research Inorganic Materials*, (1982-1983), 10-12, "X-ray Difin fraction Powder Data and Some Physical Properties of $NdAl_2(B_4O_{10})O_{0.5}$" which is hereby incorporated by reference. A molten solution of $BaO-B_2O_3-NdAl_3(BO_3)_4$ was heated to 1120° C. and maintained at that temperature for 13 hours, then cooled down to 900° C. at the rate of 20° C./hr by the authors to obtain "a lot of small and thin crystals." The crystalline material produced by the indicated route is believed to be well-defined, dense crystalline particles which have an extremely low surface due to heating a mixture of oxides to a temperature of 1120° C.

A. V. Pashkova, O. V. Sorokina, N. I. Leonyuk, T. I. Timchenko, and N. V. Belov, disclose four double metaborates having the general formula $TRAl_{1.67+0.67X}(B_4O_{10})O_X$ where TR is lanthanum, cerium, praseodymium, or neodymium and X varies from 0 to 1, Sov. Phys, Dokl. 26(5), 457-459 (May 1981). Crystals of these materials were obtained from solution in a melt of potassium trimolybdate by crystallization in the form of hexagonal plates at temperatures in the range of 1100° to 800° C. by smoothly lowering the temperature at a rate of 0.5° to 2° C./hr. The authors state that their attempts to obtain dimetaborates of other rare earth elements by the same method did not yield positive results.

In the Pashkova paper, FIG. 2. shows a relationship between unit-cell parameters of four TRAl-dimetaborates and ionic radius of TR elements where TR is lanthanum, cerium, praseodymium, or neodymium. The authors state that, under the given conditions, the borates obtained are stable only for elements at the beginning of the rare-earth series, i.e., for elements having ionic radii in a range from the ionic radius of lanthanum to the ionic radius of neodymium.

The effective ionic radii of Shannon & Prewitt, *Acta Cryst.* (1969), B25, 925-945, have been revised to include more unusual oxidation states and coordinations by R. D. Shannon in *Acta Cryst.* (1976), A32, 751-767, incorporated herein by reference. Effective ionic radii found in Shannon for selected elements at valence 3+ and coordination number VI are set out below.

| Effective Ionic Radii | |
|---|---|
| Ion[1] | IR[2], Å |
| Scandium, Sc | 0.745 |
| Indium, In | 0.800 |
| Lutetium, Lu | 0.861 |
| Ytterbium, Yb | 0.868 |
| Thulium, Tm | 0.880 |
| Erbium, Er | 0.890 |
| Holmium, Ho | 0.901 |
| Yttrium, Y | 0.900 |
| Dysprosium, Dy | 0.912 |
| Terbium, Tb | 0.923 |
| Gadolinium, Gd | 0.938 |
| Europium, Eu | 0.947 |
| Samarium, Sm | 0.958 |
| Promethium, Pm | 0.970 |
| Neodymium, Nd | 0.983 |
| Praseodymium, Pr | 0.990 |
| Cerium, Ce | 1.01 |
| Lanthanum, La | 1.032 |

[1]Ion at valence 3+ and coordination number VI.
[2]Effective ionic radii in Angstroms, Å.

The general object of the present invention is to provide new crystalline materials having chemical and physical characteristics that make them useful catalytically and/or optically.

Another general object of this invention is to produce a new solid material which is useful in various catalyzed processes including partial oxidation and/or oxidative dehydrogenation of hydrocarbons and oxygen-containing hydrocarbons, in dehydrogenation of alkylaromatic compounds, in dealkylation of alkyaromatic compounds, and in ammoxidation of alkylaromatic compounds.

Another general object of this invention is to produce new synthetic crystalline compositions which are useful as frequency doubling materials in laser applications, and/or fluorescence materials.

Other objects and advantages of the invention will become apparent upon reading the following detailed description and appended claims.

SUMMARY OF THE INVENTION

In one aspect, the present invention is a crystalline inorganic material comprising aluminum, boron, oxygen and at least one element selected from the group consisting of Group IIIB of the Periodic Table having effective ionic radii less than about 0.98 Angstroms at valence 3+ and coordination number VI, the material having an X-ray diffraction pattern comprising significant lines substantially as described in Table I.

The Periodic Table is the well known arrangement of chemical elements based on the periodic law and is found in *Webster's Ninth New Collegiate Dictionary,* Merriam-Webster Inc., Springfield, Mass., U.S.A., (1984) at page 874. Group IIIB elements are scandium, yttrium, the lanthanide series (elements with atomic numbers 57 through 71) and the actinide series (elements with atomic numbers 90 through 103). Rare earth elements include all Group IIIB elements not in the actinide series.

Biphasic crystalline inorganic materials comprising aluminum, boron, oxygen and at least transition element selected from the group consisting of Group IIIB of the Periodic Table having an X-ray diffraction pattern comprising significant lines substantially as described in Table I and lines identifying crystalline $Ln_2O_3 \cdot 3 Al_2O_3 4 B_2O_3$ are claimed in commonly assigned application Ser. No. 330,608 filed on even date in the name of Luetkens and Satek, now U.S. Pat. No. 4,990,480, which is hereby incorporated by reference. As indicated below, the catalyst of this invention can be used for conversion of alcohols to useful organic compounds, such as alkenes, aldehydes, and/or ketones (this is the subject of commonly assigned application Ser. No. 330,417, filed on even date in the name of Luetkens et al., now U.S. Pat. No. 4,929,763, which is hereby incorporated by reference).

In another aspect, the invention describes the preparation and properties of a crystalline inorganic material comprising aluminum, boron, oxygen, and at least one Group IIIB element, preferably selected from the group consisting of rare earth elements having effective ionic radii less than about 0.98 Angstroms at valence 3+ and coordination number VI, made by calcining a mixture containing sources of trivalent Group IIIB ions, alumina, and boria at elevated temperature, the material providing an X-ray pattern comprising lines substantially as shown in Table I.

In a preferred embodiment, the present invention is an inorganic material comprising crystalline

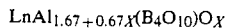

$$LnAl_{1.67+0.67X}(B_4O_{10})O_X$$

where Ln is at least one trivalent ion, preferably selected from the group consisting of Group IIIB of the Periodic Table having effective ionic radii less than about 0.98 Angstroms at valence 3+ and coordination number VI, preferably having effective ionic radii in a range from about 0.975 to about 0.8 Angstroms and more preferably in a range from about 0.97 to about 0.86 Angstroms, and X is a number ranging from 0 to 1, preferably about ½, the material having an X-ray diffraction pattern comprising significant lines and assigned strengths substantially as shown in Table I.

TABLE I

| Principal XRD Lines | |
|---|---|
| Interplanar Spacing d,[1] Å | Assigned Strength[2] |
| 9.15 ± 0.25 | M-S |
| 4.57 ± 0.15 | W-M |

TABLE I-continued

Principal XRD Lines

| Interplanar Spacing d,[1] Å | Assigned Strength[2] |
|---|---|
| 3.62 ± 0.10 | VS |
| 2.98 ± 0.08 | S |
| 2.41 ± 0.05 | W |
| 2.28 ± 0.05 | W |
| 1.98 ± 0.04 | W |
| 1.82 ± 0.04 | W |

[1] Angstroms
[2] VW = very weak; W = weak; M = medium; S = strong; VS = very strong As is generally known, the assigned strengths in X-ray diffraction patterns may vary depending upon the characteristics of the sample. The observed line strength in any particular sample may vary from another sample. Also, X-ray diffraction lines of a particular crystalline material may be obscured by lines from other materials present in a measured sample.

Preferred embodiments include crystalline material having the following empirical formulas:

$LuAl_2B_4O_{10.5}$,
$YbAl_2B_4O_{10.5}$,
$TmAl_2B_4O_{10.5}$,
$ErAl_2B_4O_{10.5}$,
$HoAl_2B_4O_{10.5}$,
$YAl_2B_4O_{10.5}$,
$DyAl_2B_4O_{10.5}$,
$TbAl_2B_4O_{10.5}$,
$GdAl_2B_4O_{10.5}$,
$EuAl_2B_4O_{10.5}$,
$SmAl_2B_4O_{10.5}$, and
$PmAl_2B_4O_{10.5}$.

Another aspect of the invention describes the preparation and properties of a crystalline material having an X-ray diffraction pattern comprising significant lines substantially as described in Table I and the chemical composition $Ln_2O_3 \cdot (m) Al_2O_3 \cdot (n) B_2O_3$ where Ln is at least one metallo element selected from the group consisting of Group IIIB of the Periodic Table having effective ionic radii less than about 0.98 Angstroms at valence 3+ and coordination number VI, and where m and n are numbers representing molar amounts of the oxides such that ratio n/m is in a range from about 0.25 to about 9, preferably about 0.42 to about 4, and more preferably about 2.

In still another aspect, the invention describes the use of such solid materials in catalytic compositions for the chemical conversion of organic compounds. In a further aspect, the invention describes the use of such materials for dehydrogenation and/or dehydration of hydrocarbons and oxygen-containing hydrocarbons, for example in the conversion of alkanes and/or alcohols to the corresponding alkenes and other useful organic compounds. In a further aspect, the invention describes the use of such materials for dehydrogenation and/or dealkylation of alkylaromatic compounds. In a further aspect, the invention describes the use of such materials for ammoxidation of alkylaromatic compounds.

In another aspect, the invention describes the use of such solid materials as frequency doubling material for laser applications. In a further aspect, the invention describes the use of such solid materials as fluorescent materials.

DETAILED DESCRIPTION OF THE INVENTION

The rare-earth, aluminum, boron, and oxygen solid materials of the present invention can be prepared by calcining a mixture of a source of lutetium(III), ytterbium(III), thulium(III), erbium(III), holmium(III), yttrium(III), dysprosium(III), terbium(III), gadolinium(III), europium(III), samarium(III), and/or promethium(III) ions, a source of alumina, and a source of boria.

Conditions of calcination include a temperature within the range of about 600° C. to about 1500° C., a pressure of at least about one atmosphere, and a reaction time that is sufficient to effect formation of a crystalline metalloaluminum borate. Increasing pressure and temperature of calcination, generally affect formation of a crystalline metalloaluminum borate in a shorter reaction time. However, a high temperature of calcination typically results in crystalline materials with less desirably surface properties, for example low surface area. Preferred calcination temperatures are in a range of about 700° C. to 1100° C. Calcination can be carried out in air, nitrogen or other inert gases. A preferred atmosphere for calcination contains oxygen.

The solid materials of this invention can be prepared generally by dispersing the required ingredients in a liquid medium, preferably an aqueous medium, removing substantially all the liquid to form superficially dry mixture, and calcining the dry mixture.

When a liquid medium is used, the source of Group IIIB element ions can be a sol or any reasonably soluble salt of lutetium(III), ytterbium(III), thulium(III), erbium(III), holmium(III), yttrium(III), dysprosium(III), terbium(III), gadolinium(III), europium(III), samarium(III), promethium(III) ions, or precursor thereof which is at least partially soluble in the dispersing liquid, such as the acetate, formate, nitrate, carbonate, chloride, bromide, sulfate and the like. Salts of rare earth elements containing a decomposable anion such as yttrium nitrate, yttrium acetate, yttrium formate, yttrium carbonate, ytterbium(III) nitrate, ytterbium(III) acetate, ytterbium(III) formate, ytterbium(III) carbonate, etc. are preferred. When the source of Group IIIB element is a sol, oxides are preferred.

Typically, best results are obtained when each of the sources used is chosen to reduce the content of foreign anions and cations in the reaction mix.

The source of alumina is any material capable of producing alumina, but preferred is a well dispersed, liquid source such as an alumina sol.

The source of boria is a material such as borate or boric acid with pure boric acid being preferred.

Typically, the mole ratios of the various reactants can be varied to produce the solid of this invention. Specifically, the mole ratios in terms of oxides of the initial reactant concentrations are characterized by the general mixed oxide formula $(x) Ln_2O_3 \cdot (y) Al_2O_3 \cdot (z) B_2O_3$ where x, y and z are numbers representing molar amounts of the oxides of the source reagents.

The mole ratios of $Ln_2O_3/B_2O_3$, calculated as x/z, are about 0.02 to about 1, preferably about 0.05 to about 0.82, and most preferably about 0.10 to about 0.50, and the mole ratios of $Al_2O_3/B_2O_3$, calculated as y/z, are from about 0.1 to about 4, preferably about 0.25 to about 2.33, and more preferably about 0.33 to about 2.

In somewhat greater detail, a preferred procedure is to dissolve the boria source and disperse the alumina source in water with mixing in a blender for about 3-5 minutes, then add an aqueous sol or solution of a source of a Group IIIB element to the blender followed by gelation with ammonia.

Typically, the pH of the aqueous mixture is less than about 11. If the reaction media is too acid or too basic, the desired solid generally will not form or other contaminating phases are formed in addition to the desired product. To some extent the pH of the reaction mixture controls surface properties of the final calcined solid material. Preferably, the pH of the reaction mixture is in a range from about 2 to about 10, more preferably about 3 to about 9, in order to gel the reaction mixture. If desired, the pH can be adjusted with a base such as ammonia, ethylenediamine, tetramethylammonium hydroxide and the like. Preferred is the use of ammonium hydroxide. The presence of the ammonia as well as other volatile components in the gelled mixture, such as acetate ion, nitrate ion, etc., is advantageous in providing the final calcined solid with sufficiently high surface area and porosity desirable for catalytic reactions.

The gelled mixture is allowed to air-dry, usually for about 1-3 days, followed by vacuum drying, typically at a pressure of about 0.3 atmosphere for about 15 to 25 hours at about 100° C. to 150° C. with a purge of dry gas, such as nitrogen.

The superficially dry mixture is calcined, preferably at a temperature within the range of about 700° to about 1100° C. for a reaction time that is sufficient to effect formation of a crystalline metalloaluminum borate, typically a reaction time within the range of about 2 to about 30 hr. Samples of material can be removed during calcination to check the degree of crystallization and determine the optimum calcination time.

The crystalline material formed can be crushed to a powder or to small particles and extruded, pelletized, or made into other forms suitable for its intended use. In a preferred embodiment of the above-described method, the crystalline material formed can be washed with a solvent, preferably an aqueous solvent, which removes impurities such as excess boria, without destroying the crystalline material formed, mildly dried for anywhere from a few hours to a few days at varying temperatures, typically about 50° to about 225° C., to form a dry cake which can then be treated as required for its intended use.

The solid materials made by this invention can be admixed with or incorporated within various binders or matrix materials depending upon the intended process use. They are combined with active or inactive materials, synthetic or naturally occurring oxides, as well as inorganic or organic materials which would be useful for binding such substances. Well-known materials include silica, silica-alumina, alumina, magnesia, titania, zirconia, alumina sols, hydrated aluminas, clays such as bentonite or kaolin, Sterotex (a powdered vegetable stearine produced by Capital City Products, Co., Columbus, Ohio), or other binders well known in the art.

Advantageously, a crystalline material formed according to this invention is formed or combined with from about 0.05 to about 50 wt % of at least one compound of a metallo element selected from the group consisting of Groups IA, IIA, IIB, VIB and VIII of the Periodic Table based on the weight of crystalline material.

Suitable alkali metal (Group IA), alkaline earth metal (Group IIA), low melting metal (Group IIB) brittle metal (Group VIB), and heavy metal (Group VIII) compounds include the oxides, hydroxides and salts of lithium, sodium, potassium, rubidium, cesium, magnesium, calcium, strontium, barium, chromium, zinc, cadmium, lanthanum, cerium, and thorium, such as lithium hydroxide, sodium hydroxide, potassium hydroxide, magnesium hydroxide, potassium oxide, sodium oxide, potassium carbonate, sodium carbonate, sodium bicarbonate, potassium nitrate, potassium borate, sodium borate, potassium chloride, potassium acetate, sodium propionate, potassium maleate, etc. Of these, potassium and chromium, in the form of the oxide or in a form readily convertible to the oxide, are preferred. The solid materials formed according to this invention can be treated with from about 0.05 to 50 wt % dopant based on the weight of the solid material. The metallo compound or compounds can be dry-blended with the aluminum borate, dissolved in a suitable solvent, preferably water, mixed with the solid material and dried; or aqueous solutions of same can be added to feedstocks going to a reactor containing the solid material catalyst.

Catalyst compositions of this invention are useful generally in the chemical conversion of organic compounds, particularly hydrocarbon and oxygenated hydrocarbon. In particular, chemical conversion reactions such as oxidation, dehydration, dehydrogenation, oxidative dehydrogenation, dealkylation, and ammoxidation have been carried out. Crystalline materials of this invention have been used for oxidation of ethanol to acetaldehyde and/or acetic acid, for dehydration of ethanol to ethylene and 2-butanol to $C_4$ olefins and/or methyl ethyl ketone, for dehydrogenation of cumene to alpha-methylstyrene, for oxidative dehydrogenation of propane to propylene, and for ammoxidation of toluene to benzonitrile.

Particularly useful is the fact that when these solid catalyst compositions are used in liquid and/or gas phase processes, the products of chemical conversion are easily separated from the solid catalyst material. Also useful is the fact that when these solid catalyst compositions are used in such fluid-phase processes, the active metallo element components are only slowly extracted, leading to longer catalyst lifetime.

Generally a process of the present invention for chemical conversion comprises contacting under suitable reaction conditions an organic reactant in a fluid phase, i.e., liquid and/or vapor phase, with a heterogeneous catalyst composition comprising a crystalline material having an X-ray diffraction pattern comprising significant lines substantially as described in Table I and a chemical composition

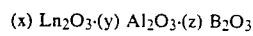

$$(x)\ Ln_2O_3 \cdot (y)\ Al_2O_3 \cdot (z)\ B_2O_3$$

where x, y and z are numbers representing molar amounts of the oxides and Ln is at least one metallo element selected from the group consisting of Group IIIB of the Periodic Table, preferably selected from the group consisting of rare earth elements and more preferably selected from the group consisting of lutetium, ytterbium, thulium, erbium, holmium, yttrium, dysprosium, terbium, gadolinium, europium, samarium, and promethium.

The following examples will serve to illustrate certain specific embodiments of the herein disclosed invention. These examples should not, however, be construed as limiting the scope of the novel invention, as there are many variations which may be made thereon without departing from the spirit of the disclosed invention, as those of skill in the art will recognize.

For example, ammoxidation processes are well known in the art and numerous processes with and without added oxygen and with numerous catalysts are described in various U.S. and foreign patents and publications.

The ammoxidation process of this invention is carried out in either a fixed bed mode of operation or in a fluidized bed at a temperature between about 375° and 500° C., preferably 400° to 459° C., most preferably about 425° to 435° C. The source of oxygen is preferably air, but any oxygen source is suitable. The amount of oxygen used in the process may vary over wide limits, but the process enables rather limited amounts of oxygen to be used and this, in turn, is favorable in that less burn of hydrocarbon reactant occurs. Thus, the ratio of oxygen to hydrocarbon in the reactant stream will usually be up to about 6:1, although it is preferable to use no more than about 3:1, preferably 2.5:1 to 3:1, although about 2.0:1 is also quite useful. Likewise the ratio of ammonia to hydrocarbon used in the process of the invention will be preferably about 3:1, or less, most preferably 2.0:1 to 3:1 although higher ratios, up to 6:1 are also useful. It is also to be understood that the volume percent concentration of reactants in the feed may be quite high as compared to most ammoxidation procedures and the feed may comprise in percent by volume 5 to 25% hydrocarbon, 6 to 20% oxygen, and 6 to 35% ammonia. In the preferred method, the volume percent concentration of reactants corresponding to the above preferred ratios will comprise in percent by volume from about 5 to about 7% toluene, from about 15 to about 20% oxygen, and from about 10 to about 20% ammonia. The fact that the process of this invention makes possible this high concentration of reactants is significant in contributing to a very efficient overall process.

As indicated, the hydrocarbon reactant will be an alkyl (preferably lower alkyl; e.g., 1 to 4 carbon atoms such as methyl, ethyl, propyl and butyl) substituted aromatic hydrocarbon and will be preferably of the benzene and naphthalene series. Most preferably, a member of the benzene series will be used such as toluene and meta- and para-xylene. When using m-xylene to obtain isophthalonitrile, however, it is preferred to employ temperatures at the lower end of the range given above and this is in accord with art knowledge that m-xylene is more sensitive to carbon oxide formation than is the p-isomer.

It will be understood that the contact time for the reactants over the catalyst will vary over a wide range, but will usually be from about 0.1 to 20 seconds. The contact time actually used will depend upon catalyst loading, catalyst volume, temperature and other parameters and the skilled art worker will have no difficulty in selecting an appropriate contact time dependent upon these reaction parameters.

The reactant feed stream will, of course, contain other materials, as for example, the inert ingredients of air, recycled intermediates (e.g., a mononitrile when a dinitrile is desired) and possibly some small amounts of other by-products associated with the recycle stream. This use of a recycle stream will make possible a still more efficient process.

In addition to the above required parameters of the process it is essential that a particular type of material be used as catalyst. Preferred is a heterogeneous catalyst composition comprising a crystalline material having an X-ray diffraction pattern comprising significant lines substantially as described in Table I and chemical composition $$Ln_2O_3 \cdot (m) Al_2O_3 \cdot (n) B_2O_3$$

where Ln is at least one metallo element selected from the group consisting of Group IIIB of the Periodic Table having effective ionic radii less than about 0.98 Angstroms at valence 3+ and coordination number VI, and where m and n are numbers representing molar amounts of the oxides such that ratio n/m is in a range from about 0.25 to about 9, preferably about 0.42 to about 4, and more preferably about 2.

EXAMPLES

General

Temperatures are in degrees Celsius.
Percents are weight percents.
Rare earth nitrates were obtained from Aldrich Chemical Co., Milwaukee, Wisc., and/or Strem Chemicals Inc., Newburyport, Mass., at 99.9% purities and were used in the following examples as received.

The percents of the $Ln_2O_3 \cdot 2 Al_2O_3 \cdot 4 B_2O_3$ phase and the $Ln_2O_3 \cdot 3 Al_2O_3 \cdot 4 B_2O_3$ phase in a crystalline material were based upon relative intensity of X-ray diffraction lines at interplanar spacing 3.62±0.10 Angstroms and 2.69±0.10 Angstroms.

Samples of crystalline material from particular examples were prepared for testing as a catalyst by admixing with alpha alumina, an inert diluent. This mixture of solids was then supported on a bed of alpha alumina and a glass wool plug in a 6 mm OD×19 cm long vycor reactor tube. The reactor tube was heated to the appropriate temperature with a small electric furnace (Tracor). Oxygen was supplied to the reactor diluted to about 8% with nitrogen and at atmospheric pressure. Gas flows from 0.01 to 0.6 mL/sec, were controlled by Brooks Flow Controllers. The reactor effluent passed through a heated Carle sampling valve which allowed for direct injections onto a 6 ft. OV17 GC column. Organic products were analyzed using a FID detector and the fixed gases (i.e., $O_2$, $H_2$, $CO$, $CO_2$) were analyzed off-line by GC using a CTR I column (All-tech) and a TC detector.

EXAMPLE 1

A crystalline lutetium aluminum borate was prepared as follows: Boric acid (29.7 g, 0.48 mol) dissolved in 148 mL warm deionized water, PHF alumina sol 129.9 g of 9.5% alumina, 0.12 mol) and $Lu(NO_3)_3 - 3H_2O$ (49.8 g, 0.12 mmol) dissolved in 25 mL warm deionized water were placed into a blender. This aqueous mixture was blended at a low speed setting to obtain a smooth white thin gel. The pH of the gel measured 4. Addition of 3 mL of $NH_4OH$ produced a thixotropic white gel, the pH of which measured 6. The gel was spread onto a 35 cm×45 cm plastic tray and air-dried to a white solid, 85.9 g, which was vacuum-dried at 0.3 atm pressure and 120° C. overnight. A 17.9 g portion of the vacuum-dried material was calcined using the following program:

$$120°\text{C.} \xrightarrow{2\text{ hrs}} 120°\text{C.} \xrightarrow{4\text{ hrs}} 1000°\text{C.} \xrightarrow{8\text{ hrs}}$$

$$1000°\text{C.} \xrightarrow{4\text{ hrs}} 120°\text{C.} \longrightarrow \text{RT}$$

The hard white chunky calcined material weighed 11.7 g and emitted fluorescence when illuminated by U.V. Analysis of this crystalline lutetium aluminum borate by powder X-ray diffraction found about 65 percent $Lu_2O_3 \cdot 2\ Al_2O_3 \cdot 4\ B_2O_3$ and about 35 percent $Lu_2O_3 \cdot 3\ Al_2O_3 \cdot 4\ B_2O_3$.

The powder X-ray diffraction lines of this crystalline lutetium aluminum borate are set out below:

| XRD Lines for Example 1 | | |
|---|---|---|
| Interplanar Spacing d,[1] Å | Assigned Strength[2] | Relative Intensity |
| 9.05 | VW | 4 |
| 4.52 | VW | 7 |
| 4.06 | M | 25 |
| 3.91 | VW | 4 |
| 3.73 | M | 36 |
| 3.59 | S | 45 |
| 3.43 | VS | 99 |
| 2.96 | M | 40 |
| 2.92 | M | 41 |
| 2.62 | S | 83 |
| 2.43 | W | 15 |
| 2.39 | W | 18 |
| 2.26 | W | 13 |
| 2.04 | W | 18 |
| 1.98 | M | 30 |
| 1.96 | W | 24 |
| 1.91 | VW | 7 |
| 1.81 | M | 39 |
| 1.77 | M | 33 |
| 1.74 | W | 18 |
| 1.64 | VW | 4 |
| 1.58 | W | 15 |
| 1.55 | VW | 12 |
| 1.48 | VW | 10 |

[1]Angstroms
[2]VW = very weak; W = weak; M = medium; S = strong; VS = very strong

EXAMPLE 2

A crystalline ytterbium aluminum borate was prepared as follows: A hot solution of boric acid (32.8 g, 0.54 mol, a 10% excess) in 200 mL distilled water was added to alumina sol (149.3 g of a 8.2% alumina sol, 0.12 mol) in a Waring blender while mixing. To this was added solid $Yb_2O_3$ (23.6 g, 0.059 mol). After an additional period of mixing, 5 mL of dilute (1:1) nitric acid was added to mixture to obtain a homogeneous white gel. The gel was spread out onto a 35 cm × 45 cm plastic tray, air-dried, then dried vacuum-dried at 120° C., and pre-calcined to 400° C. A portion of this material was calcined at 950° C. Analysis of the resulting crystalline ytterbium aluminum borate by powder X-ray diffraction found about 90+ percent $Yb_2O_3 \cdot 2\ Al_2O_3 \cdot 4\ B_2O_3$. The powder X-ray diffraction lines of the crystalline ytterbium aluminum borate are set out below:

| XRD Lines for Example 2 | | |
|---|---|---|
| Interplanar Spacing d,[1] Å | Assigned Strength[2] | Relative Intensity |
| 9.16 | S | 72 |
| 4.56 | M | 31 |

-continued

| XRD Lines for Example 2 | | |
|---|---|---|
| Interplanar Spacing d,[1] Å | Assigned Strength[2] | Relative Intensity |
| 3.94 | W | 16 |
| 3.61 | VS | 100 |
| 2.98 | S | 67 |
| 2.40 | M | 28 |
| 2.27 | W | 19 |
| 2.20 | VW | 11 |
| 2.03 | VW | 11 |
| 1.97 | W | 24 |
| 1.92 | W | 16 |
| 1.82 | W | 22 |
| 1.81 | W | 19 |
| 1.52 | VW | 5 |
| 1.49 | VW | 5 |
| 1.47 | VW | 5 |
| 1.42 | VW | 9 |
| 1.41 | VW | 9 |

[1]Angstroms
[2]VW = very weak; W = weak; M = medium; S = strong; VS = very strong

EXAMPLE 3

Another example of crystalline ytterbium aluminum borate was prepared as follows: Boric acid (25.2 g, 0.408 mol) dissolved in 120 mL hot deionized water, PHF alumina sol (190.6 g of 8.2% alumina, 0.153 mol) and $Yb(NO_3)_3 - 5H_2O$ (45.8 g, 0.102 mol) dissolved in 50 mL deionized water were placed into a blender. The aqueous mixture was blended at a low setting, and 24 mL ammonium hydroxide was added to the aqueous mixture which became a gel. After further blending for several minutes, the gel was placed onto a 35 cm × 45 cm plastic tray and air-dried, then vacuum dried (0.3 atm, 110° C.), and calcined according to the following program:

$$100°\text{C.} \xrightarrow{1\text{ hr}} 300°\text{C.} \xrightarrow{2\text{ hrs}} 300°\text{C.} \xrightarrow{1\text{ hr}}$$

$$400°\text{C.} \xrightarrow{4\text{ hrs}} 890°\text{C.} \xrightarrow{8\text{ hrs}} 890°\text{C.} \xrightarrow{4\text{ hrs}}$$

$$700°\text{C.} \longrightarrow \text{RT}$$

Analysis of this white crystalline lutetium aluminum borate by powder X-ray diffraction found about 70 percent $Yb_2O_3 \cdot 2\ Al_2O_3 \cdot 4\ B_2O_3$ and about 30 percent $Yb_2O_3 \cdot 3\ Al_2O_3 \cdot 4\ B_2O_3$. The BET surface area of this material was determined to be 3.1 m²/g.

EXAMPLE 4

A 1 cc sample of ytterbium aluminum borate from Example 3 (18-35 mesh powder) was prepared for testing as a catalyst by admixing with 0.3 mL of 18/35 mesh alpha alumina, an inert diluent. This mixture of solids was then tested by the procedure described hereinabove. Initially, the catalyst was conditioned for one hour at 300° C. under nitrogen, and for one hour at 500° C. under nitrogen.

At a temperature of 500° C., a gas flow (8% oxygen in nitrogen) of 0.097 mL/sec, and an ethanol flow of 0.00234 mL/min the results were:
 Conversion of ethanol 99%
 Selectivity to ethylene 89%

At a temperature of 500° C., a gas flow (8% oxygen in nitrogen) of 0.097 mL/sec, and a 2-butanol flow of 0.00234 mL/min the results were:
  Conversion of 2-butanol 98%
  Selectivity to C$_4$ olefins 98%
At a temperature of 600° C., a gas flow (8% oxygen in nitrogen) of 0.321 mL/sec, an ammonia flow of 0.013 mL/sec, and a liquid toluene flow of 0.00234 mL/min the results were:
  Conversion of toluene 18%
  Selectivity to benzcnitrile 85%
At a temperature of 600° C., a gas flow (8% oxygen in nitrogen) of 0.097 mL/sec, and a propane flow of 0.0094 mL/sec the results were:
  Conversion of propane 12%
  Selectivity to propene 89%

EXAMPLE 5

Another example of crystalline ytterbium aluminum borate was prepared as follows: Boric acid (10.0 g, 0.162 mol) dissolved in 50 mL hot deionized water, PHF alumina sol (403.5 g of 8.2% alumina, 0.324 and Yb(NO$_3$)$_3$—5H$_2$O (24.2 g, 0.054 mol) dissolved in 50 mL deionized water were placed into a blender. This aqueous mixture was blended at a low setting, and 14 mL ammonium hydroxide was added to the aqueous mixture which then became a thick, white gel. After further blending for several minutes, the gel was air-dried to a solid, vacuum-dried (0.3 atm, 110° C.), and calcined according to the following program:

$$100° C. \xrightarrow{1\ hr} 300° C. \xrightarrow{2\ hrs} 300° C. \xrightarrow{1\ hr}$$

$$400° C. \xrightarrow{4\ hrs} 915° C. \xrightarrow{8\ hrs} 915° C. \xrightarrow{5\ hrs}$$

$$660° C. \longrightarrow RT$$

Analysis of this white ytterbium aluminum borate of low crystallinity by powder X-ray diffraction found 95+ percent crystalline Lu$_2$O$_3$·3 Al$_2$O$_3$·4 B$_2$O$_3$. The BET surface area of this material was determined to be 24 m$^2$/g.

EXAMPLE 6

A 0.66 g sample of crystalline ytterbium aluminum borate from Example 5 (18–35 mesh powder) compound was prepared for testing as a catalyst by admixing with 0.3 mL of 18/35 mesh alpha alumina, an inert diluent. This mixture of solids was then tested by the procedure described hereinabove. Initially, the catalyst was conditioned for one hour at 300° C. under nitrogen, and for one hour at 500° C. under nitrogen.

At a temperature of 600° C., a gas flow (8% oxygen in nitrogen) of 0.321 mL/sec, and a liquid toluene flow of 0.00234 mL/min the results were:
  Conversion of toluene 6%
  Selectivity to benzene 80%
At a temperature of 500° C., a gas flow (8% oxygen in nitrogen) of 0.321 mL/sec, an ammonia flow of 0.013 mL/sec, and a liquid toluene flow of 0.00234 mL/min the results were:
  Conversion of toluene 15%
  Selectivity to benzonitrile 96%
At a temperature of 500° C., a gas flow (8% oxygen in nitrogen) of 0.097 mL/sec, and an ethanol flow of 0.00234 mL/min the results were:
  Conversion of ethanol 88%
  Selectivity to ethylene 45%
At a temperature of 400° C., a gas flow (8% oxygen in nitrogen) of 0.097 mL/sec, and a 2-butanol flow of 0.00234 mL/min the results were:
  Conversion of 2-butanol 100%
  Selectivity to C$_4$ olefins 91%

EXAMPLE 7

A crystalline thulium aluminum borate was prepared as follows: Boric acid (16.3 g, 0.264 mol) dissolved in 70 mL warm deionized water, PHF alumina sol (79.3 g of 8.6% alumina, 0.067 mol) were placed into a blender, and Tm(NO$_3$)$_3$—5H$_2$O (30.0 g, 0.067 mol) added directly to the aqueous mixture by rinsing out six 5.00 g containers with 10 mL deionized water. The aqueous mixture was blended at a low setting to obtain a smooth white thixotropic gel the pH of which measured 5. The gel was placed onto a 35 cm×45 cm plastic tray and air-dried. The white solid, 47.3 g, was vacuum-dried overnight (0.3 atm, 120° C.) resulting a material which weighed 35.2 g. A 9.8 g portion of the material was calcined using the following program:

$$120° C. \xrightarrow{2\ hrs} 165° C. \xrightarrow{4\ hrs} 920° C. \xrightarrow{8\ hrs}$$

$$920° C. \xrightarrow{4\ hrs} RT$$

The calcined material weighed 6.3 g and emitted fluorescence when illuminated by U.V. Analysis of this crystalline thulium aluminum borate by powder X-ray diffraction found about 60 percent Tm$_2$O$_3$·2 Al$_2$O$_3$·4 B$_2$O$_3$ and about 40 percent Tm$_2$O$_3$·3 Al$_2$O$_3$·4 B$_2$O$_3$. The powder X-ray diffraction lines of the crystalline thulium aluminum borate are set out below:

| XRD Lines for Example 7 | | |
|---|---|---|
| Interplanar Spacing d,[1] Å | Assigned Strength[2] | Relative Intensity |
| 9.08 | S | 87 |
| 5.30 | VW | 10 |
| 4.55 | M | 34 |
| 4.14 | M | 36 |
| 3.92 | W | 17 |
| 3.60 | VS | 100 |
| 3.46 | S | 87 |
| 3.25 | VW | 12 |
| 3.18 | S | 56 |
| 2.97 | S | 71 |
| 2.65 | S | 71 |
| 2.61 | W | 21 |
| 2.40 | M | 29 |
| 2.27 | W | 15 |
| 2.20 | VW | 8 |
| 2.00 | VW | 12 |
| 1.97 | W | 14 |
| 1.92 | W | 13 |
| 1.82 | W | 23 |
| 1.80 | M | 26 |
| 1.78 | W | 17 |
| 1.73 | VW | 5 |
| 1.60 | VW | 7 |
| 1.42 | VW | 6 |

[1] Angstroms
[2] VW = very weak; W = weak; M = medium; S = strong; VS = very strong

EXAMPLE 8

A crystalline erbium aluminum borate was prepared as follows: A hot solution of boric acid (32.8 g, 0.54 mol, a 10% excess) in 200 mL distilled water was added to alumina sol (149.3 g of a 8.2% alumina sol, 0.12 mol) in a Waring blender while mixing. To this was added a hot solution containing $Er(NO_3)_3 - 5H_2O$ (53.2 g, of distilled water. After thorough mixing, 15 mL of dilute (1:1) nitric acid was added to obtain a homogeneous gel. Mixing was continued until a smooth and uniform pink gel was obtained. The gel was air-dried, vacuum-dried at 120° C. and pre-calcined to 400° C. A portion of this material was calcined at 900° C. Analysis of this crystalline erbium aluminum borate by powder X-ray diffraction found about 90 percent $Er_2O_3 \cdot 3\ Al_2O_3 \cdot 4\ B_2O_3$. The powder X-ray diffraction lines of the resulting crystalline erbium aluminum borate are set out below:

XRD Lines for Example 8

| Interplanar Spacing d,[1] Å | Assigned Strength[2] | Relative Intensity |
| --- | --- | --- |
| 8.98 | W | 25 |
| 4.54 | W | 18 |
| 3.92 | VW | 9 |
| 3.61 | VS | 100 |
| 2.98 | S | 71 |
| 2.41 | W | 24 |
| 2.27 | W | 16 |
| 2.21 | VW | 9 |
| 2.03 | W | 17 |
| 1.82 | M | 31 |
| 1.81 | M | 31 |

[1] Angstroms
[2] VW = very weak; W = weak; M = medium; S = strong; VS = very strong Another example of crystalline erbium aluminum borate was prepared as follows: Boric acid (b 25.7 g, 0.416 mol) dissolved in 93 mL hot deionized water, PHF alumina sol (241.1 g of 6.6% alumina, 0.156 mol) and $Er(NO_3)_3 - 5H_2O$ (23.1 g, 0.052 mol) dissolved in 93 mL deionized water were placed into a blender. The aqueous mixture was blended at a low setting, and 4 mL ammonium hydroxide was added to the aqueous mixture which then became a thick gel, light pink in color. After further blended for several minutes the gel was air-dried, vacuum-dried for 72 hours (0.3 atm, 110° C.), and calcined according to the following program:

$$100°\ C. \xrightarrow{1\ hr} 300°\ C. \xrightarrow{2\ hrs} 300°\ C. \xrightarrow{1\ hr}$$

$$400°\ C. \xrightarrow{4\ hrs} 890°\ C. \xrightarrow{8\ hrs} 890°\ C. \xrightarrow{4\ hrs}$$

$$700°\ C. \longrightarrow RT$$

Analysis of this pink erbium aluminum borate by powder X-ray diffraction found about 40 percent $Er_2O_3 \cdot 2\ Al_2O_3 \cdot 4\ B_2O_3$ and about 60 percent $Er_2O_3 \cdot 3\ Al_2O_3 \cdot 4\ B_2O_3$. The BET surface area of this material was determined to be 1.7 m²/g.

EXAMPLE 10

A 0.68 g sample of crystalline erbium aluminum borate from Example 9 (18–35 mesh powder) was prepared for testing as a catalyst by admixing with 0.3 mL of 18/35 mesh alpha alumina, an inert diluent. This mixture of solids was then tested by the procedure described hereinabove. Initially, the catalyst was conditioned for ¾ hour at 300° C. under nitrogen, and for ¾ hour at 500° C. under nitrogen.

At a temperature of 500° C., a gas flow (8% oxygen in nitrogen) of 0.097 mL/sec, and an ethanol flow of 0.00234 mL/min the results were:
  Conversion of ethanol 93%
  Selectivity to ethylene 66%
  Selectivity to acetaldehyde 18%

At a temperature of 500° C., a gas flow (8% oxygen in nitrogen) of 0.097 mL/sec, and a 2-butanol flow of 0.00234 mL/min the results were:
  Conversion of 2-butanol 100%
  Selectivity to $C_4$ olefins 89%

EXAMPLE 11

Another example of crystalline erbium aluminum borate was prepared as follows: Boric acid (25.7 g, 0.416 mol) dissolved in 94 mL hot deionized water, PHF alumina sol (194.3 g of 8.2% alumina, 0.156 mol) and $Er(NO_3)_3 - 5H_2O$ (46.1 g, 0.104 mol) were placed into a blender. The aqueous mixture was blended at a low setting, and 9 mL ammonium hydroxide was added to the mixture to form a gel. After further blending for several minutes the gel was air-dried, vacuum-dried for 48 hours (0.3 atm, 120° C.), and calcined according to the following program:

$$100°\ C. \xrightarrow{2\ hrs} 300°\ C. \xrightarrow{1\ hr} 300°\ C. \xrightarrow{0.5\ hrs}$$

$$400°\ C. \xrightarrow{4\ hrs} 860°\ C. \xrightarrow{8\ hrs} 860°\ C. \xrightarrow{4\ hrs}$$

$$500°\ C. \longrightarrow RT$$

Analysis of this crystalline erbium aluminum borate by powder X-ray diffraction found about 60 percent $Er_2O_3 \cdot 2\ Al_2O_3 \cdot 4\ B_2O_3$ and about 40 percent $Er_2O_3 \cdot 3\ Al_2O_3 \cdot 4\ B_2O_3$. The BET surface area of this material was determined to be 0.8 m²/g.

EXAMPLE 12

A 1.06 g sample of crystalline erbium aluminum borate from Example 11 (18–35 mesh powder) was prepared ing as a catalyst by mixing with 0.3 mL of 18/35 mesh alpha alumina, an inert diluent. This mixture of solids was then tested by the procedure described hereinabove. Initially, the catalyst was conditioned for one hour at 300° C. under nitrogen, and for one hour at 500° C. under nitrogen.

At a temperature of 500° C., a gas flow (8% oxygen in nitrogen) of 0.097 mL/sec, and an ethanol flow of 0.00234 mL/min the results were:
  Conversion of ethanol 100%
  Selectivity to ethylene 96%

At a temperature of 500° C., a gas flow (8% oxygen in nitrogen) of 0.097 mL/sec, and a 2-butanol flow of 0.00234 mL/min the results were:
  Conversion of 2-butanol 100%
  Selectivity to $C_4$ olefins 98%

EXAMPLE 13

A crystalline holmium aluminum borate was prepared as follows: Boric acid (47.6 g, 0.771 mol) dissolved in 240 mL of warm deionized water, PHF alumina sol (207.8 g of 9.5% alumina, 0.193 mol) and Ho(-

NO$_3$)$_3$—5H$_2$O dissolved in 45 mL of warm deionized water were placed into a blender. The mixture was blended at a low setting to obtain a thin pink gel. The pH of the gel measured 2.1. Upon addition of 20 mL ammonium hydroxide and subsequent blending, the mixture became somewhat thicker and the pH measured 4.2. Addition of another 20 mL of ammonium hydroxide and subsequent blending resulted in a thick light pink gel. The pH of the final gel measured 6. The gel was air-dried, vacuum-dried for 20 hours (0.3 atm, 120° C.) to a weight of 110.3 g, and calcined using the following program:

$$120°\text{ C.} \xrightarrow{2\text{ hrs}} 165°\text{ C.} \xrightarrow{4\text{ hr}} 880°\text{ C.} \xrightarrow{12\text{ hrs}}$$

$$880°\text{ C.} \xrightarrow{2\text{ hrs}} 120°\text{ C.} \longrightarrow \text{RT}$$

The pink calcined material emitted fluorescence when illuminated by U.V. Analysis of this holmium aluminum borate by powder X-ray diffraction found about 85 percent Er$_2$O$_3$·2 Al$_2$O$_3$·4 B$_2$O$_3$ and about 15 percent Er$_2$O$_3$·3 Al$_2$O$_3$·4 B$_2$O$_3$. The powder X-ray diffraction lines are set out below:

| XRD Lines for Example 13 | | |
|---|---|---|
| Interplanar Spacing d,[1] Å | Assigned Strength[2] | Relative Intensity |
| 9.16 | VW | 6 |
| 4.55 | W | 14 |
| 4.34 | VW | 10 |
| 3.92 | VW | 4 |
| 3.61 | VS | 100 |
| 3.48 | W | 16 |
| 3.28 | M | 27 |
| 2.97 | VS | 96 |
| 2.66 | W | 18 |
| 2.61 | M | 42 |
| 2.40 | M | 40 |
| 2.26 | M | 33 |
| 2.20 | W | 18 |
| 1.97 | S | 55 |
| 1.92 | M | 27 |
| 1.81 | S | 69 |
| 1.78 | W | 12 |
| 1.73 | VW | 8 |
| 1.60 | VW | 8 |
| 1.48 | VW | 10 |
| 1.46 | VW | 9 |
| 1.42 | W | 23 |
| 1.41 | W | 19 |

[1]Angstroms
[2]VW = very weak; W = weak; M = medium; S = strong; VS = very strong A second portion was calcined using the following program:

$$120°\text{ C.} \xrightarrow{2\text{ hrs}} 165°\text{ C.} \xrightarrow{4\text{ hrs}} 1000°\text{ C.} \xrightarrow{8\text{ hrs}}$$

$$1000°\text{ C.} \xrightarrow{4\text{ hrs}} 120°\text{ C.} \longrightarrow \text{RT}$$

Analysis of this crystalline holmium aluminum borate by powder X-ray diffraction pattern of high crystallinity found about 10 percent Ho$_2$O$_3$·2 Al$_2$O$_3$·4 B$_2$O$_3$ and about 90 percent Ho$_2$O$_3$·3 Al$_2$O$_3$·4 B$_2$O$_3$.

EXAMPLE 14

A crystalline yttrium aluminum borate was prepared as follows: A hot solution of boric acid (32.8 g, 0.54 mol, mina sol (174.1 g of a 8.2% alumina sol, 0.14 mol) in a Waring blender while mixing. To this was added a hot solution containing 53.6 g of Y(NO$_3$)$_3$—6H$_2$O (53.6 g, 0.14 mol) in 15 mL of distilled water. After thorough mixing, 20 ml of ammonium hydroxide solution (1:1 concentrated NH$_4$OH and distilled water) was added to obtain a gel. Mixing was continued until a smooth and uniform white gel was obtained. The gel was air-dried, vacuum-dried at 120° C., and pre-calcined to 400° C. A portion of the dry material was calcined at 975° C. The calcined material emitted fluorescence when illuminated by U.V. Analysis of this crystalline yttrium aluminum borate by powder X-ray diffraction pattern of high crystallinity found about 55 percent Y$_2$O$_3$·2 Al$_2$O$_3$·4 B$_2$O$_3$ and about 45 percent Y$_2$O$_3$·3 Al$_2$O$_3$·4 B$_2$O$_3$. The powder X-ray diffraction lines are set out below:

| XRD Lines for Example 14 | | |
|---|---|---|
| Interplanar Spacing d,[1] Å | Assigned Strength[2] | Relative Intensity |
| 9.17 | VW | 8 |
| 5.37 | W | 16 |
| 4.58 | W | 16 |
| 4.38 | S | 49 |
| 3.62 | S | 92 |
| 3.51 | M | 30 |
| 3.28 | S | 81 |
| 3.18 | W | 24 |
| 2.99 | S | 73 |
| 2.69 | S | 81 |
| 2.62 | VS | 100 |
| 2.41 | W | 22 |
| 2.33 | M | 27 |
| 2.28 | W | 16 |
| 2.13 | W | 16 |
| 2.04 | W | 16 |
| 1.98 | W | 24 |
| 1.90 | M | 35 |
| 1.82 | S | 65 |
| 1.81 | M | 32 |
| 1.74 | W | 24 |
| 1.64 | M | 43 |
| 1.43 | W | 24 |

[1]Angstroms
[2]VW = very weak; W = weak; M = medium; S = strong; VS = very strong

EXAMPLE 15

A small portion of the powder was examined for second harmonic generation efficiency using a Q-switched mode locked YAG laser operating at 1060 nm. Green light was observed from most of the crystals, which was bright in spots. This indicates the frequency doubling character of the crystals.

EXAMPLE 16

A crystalline yttrium aluminum borate was prepared using an yttria sol as follows: Boric acid (13.9 g, 0.22 mol) dissolved in 182 mL warm deionized water, PHF alumina sol (196.2 g of 7.8% alumina, 0.15 mol) and Y$_2$O$_3$ sol obtained as an experimental sample of PQ Co. (17.0 g of 14.1% yttria, 0.011 mol) were placed into a blender. The mixture was blended at a low setting and 28 mL ammonium hydroxide was added to obtain a gel. The gel was airdried, vacuum-dried overnight (0.3 atm, 106° C.) to a weight of 34.8 g and calcined using the following program:

$$25°\text{ C.} \xrightarrow{2\text{ hrs}} 165°\text{ C.} \xrightarrow{4\text{ hrs}} 830°\text{ C.} \xrightarrow{8\text{ hrs}}$$

-continued $$830° C. \xrightarrow{\phantom{xx}} RT$$

The calcined material weighed 22.8 g and had a BET surface area of less than 1 m²/g. Analysis of this crystalline yttrium aluminum borate by powder X-ray diffraction pattern of high crystallinity found about 40 percent $Y_2O_3 \cdot 2 Al_2O_3 \cdot 4 B_2O_3$ and about 60 percent $Y_2O_3 \cdot 3 Al_2O_3 \cdot 4 B_2O_3$.

EXAMPLE 17

Another example of crystalline yttrium aluminum borate was prepared as follows: Boric acid (41.2 g, 0.67 (392.2 g of 7.8% alumina, 0.30 mol) and yttrium nitrate hexahydrate (25.5 g, 0.067 mol) dissolved in 30 mL warm deionized water were placed into a blender. The mixture was blended for about two minutes. Ammonium hydroxide, 10 mL, was added followed by two minutes of blending and a second addition of ammonium hydroxide, 15 mL, followed by another one minute of blending the mixture to obtain gel formation. The gel was air-dried to a weight of 110.0 g. A 75 g portion of the sample was vacuum-dried for 17 hours at 120° C. and 0.3 atm to obtain a dry solid material which weighed 58.6 g. A 15.0 g portion of the dry solid material was calcined according to the following program:

$$125° C. \xrightarrow{2 \text{ hrs}} 165° C. \xrightarrow{4 \text{ hrs}} 300° C. \xrightarrow{4 \text{ hrs}}$$

$$830° C. \xrightarrow{4 \text{ hrs}} 830° C. \xrightarrow{0.5 \text{ hrs}} 930° C. \xrightarrow{4 \text{ hrs}}$$

$$930° C. \xrightarrow{\phantom{xx}} RT$$

The calcined material weighed 12.0 g and its BET surface area measured 11 m²g with a pore volume of 0.052. Analysis of this crystalline yttrium aluminum borate by powder X-ray diffraction pattern of high crystallinity found about 60 percent $Y_2O_3 \cdot 2 Al_2O_3 \cdot 4 B_2O_3$ and about 40 percent $Y_2O_3 \cdot 3 Al_2O_3 \cdot 4 B_2O_3$.

EXAMPLE 18

Another example of crystalline yttrium aluminum borate was prepared as follows: Into a blender are placed boric acid (30.65 g, 0.50 mol) and yttrium nitrate hexahydrate (47.5 g, 0.124 mol) dissolved in 111 mL hot distilled water, and alumina sol (243.2 g of 7.8% alumina, 0.186 mol). To this was added 7 mL conc. NH₄OH with blending. The resulting gel was air-dried and a portion of the dry gel was calcined as follows:

$$50° C. \xrightarrow{4 \text{ hrs}} 300° C. \xrightarrow{1 \text{ hr}} 300° C. \xrightarrow{9.5 \text{ hrs}}$$

$$870° C. \xrightarrow{8 \text{ hrs}} 870° C. \xrightarrow{3.5 \text{ hrs}} 600° C. \xrightarrow{\phantom{xx}} RT$$

Analysis of this crystalline yttrium aluminum borate by powder X-ray diffraction pattern of high crystallinity found about 40 percent $Y_2O_3 \cdot 2 Al_2O_3 \cdot 4 B_2O_3$ and about 60 percent $Y_2O_3 \cdot 3 Al_2O_3 \cdot 4 B_2O_3$. The surface area of the calcined material was 1 m²/g.

EXAMPLE 19

A 0.91 g sample of crystalline yttrium aluminum borate from Example Y-5 (18-35 mesh powder) was prepared for testing as a catalyst by admixing with 0.1 mL of 18/35 mesh alpha alumina, an inert diluent. This mixture of solids was then tested by the procedure described hereinabove. At a temperature of 500° C., a gas flow (8% oxygen in nitrogen) of 0.097 mL/sec, and an ethanol flow of 0.00234 mL/min the results were:

Conversion of ethanol 100%

Selectivity to ethylene 96%. At a temperature of 500° C., a gas flow (8% oxygen in nitrogen) of 0.097 mL/sec, and a 2-butanol flow of 0.00234 mL/min the results were:

Conversion of 2-butanol 99.5%

Selectivity to C₄ olefins 98.5%. At a temperature of 600° C., a gas flow (8% oxygen in nitrogen) of 0.097 mL/sec and a propane flow of 0.017 mL/sec, the results were:

Conversion of propane 32%

Selectivity to propene 46%

EXAMPLE 20

A crystalline dysprosium aluminum borate was prepared as follows: A hot solution of boric acid (32.8 g, 0.54 mol, a 10% excess) in 200 mL distilled water was added to alumina sol (149.3 g of an 8.2% alumina sol, distilled water was added to alumina sol (149.3 g of an 8.2% alumina sol, solution containing $Dy(NO_3)_3 - 5-H_2O$ (52.7 g, 0.12 mol) in 15 mL of distilled water. After thorough mixing, 15 mL of dilute (1:1) nitric acid was added to obtain a homogeneous gel. Mixing was continued until a smooth and uniform off-white gel was obtained. The gel was air-dried, vacuum-dried at 400° C. and a portion of the dry material was calcined at 975° C. Analysis of this crystalline dysprosium aluminum borate by powder X-ray diffraction pattern of high crystallinity found about 50 percent $Dy_2O_3 \cdot 2 Al_2O_3 \cdot 4 B_2O_3$ and about 50 percent $Dy_2O_3 \cdot 3 Al_2O_3 \cdot 4 B_2O_3$. The powder X-ray diffraction lines of the crystalline dysprosium aluminum borate are set out below:

| XRD Lines for Example 20 | | |
|---|---|---|
| Interplanar Spacing d,[1] Å | Assigned Strength[2] | Relative Intensity |
| 9.20 | W | 17 |
| 5.39 | M | 39 |
| 4.64 | M | 30 |
| 4.59 | W | 17 |
| 4.42 | M | 26 |
| 3.62 | VS | 97 |
| 3.52 | S | 57 |
| 3.28 | S | 57 |
| 2.99 | S | 57 |
| 2.80 | M | 30 |
| 2.69 | VS | 100 |
| 2.64 | S | 52 |
| 2.42 | W | 22 |
| 2.33 | M | 43 |
| 2.13 | M | 26 |
| 1.98 | W | 17 |
| 1.92 | W | 17 |
| 1.90 | M | 35 |
| 1.83 | M | 30 |
| 1.76 | W | 17 |
| 1.64 | W | 22 |
| 1.63 | W | 22 |
| 1.43 | M | 39 |

[1] Angstroms
[2] VW = very weak; W = weak; M = medium; S = strong; VS = very strong

EXAMPLE 21

A small portion of the powder was examined for second harmonic generation efficiency using a Q-switched mode locked YAG laser operating at 1060 nm. Green light was observed from most of the crystals, which was bright in spots. This indicates the frequency doubling character of the crystals.

EXAMPLE 22

A crystalline dysprosium aluminum borate was prepared as follows: Boric acid (38.6 g, 0.62 mol) dissolved in 140 mL hot deionized water, PHF alumina sol (120.6 g of 6.6% alumina, 0.78 mol) and Dy(NO$_3$)$_3$—5H$_2$O (45.6 g, 0.104 mol) dissolved in 140 mL deionized water were placed into a blender. The mixture was blended at a low setting, and 131 mL ammonium hydroxide was added to obtain a very thin gel. The gel was air-dried, vacuum-dried (0.3 atm, 110° C.), and calcined according to the following program:

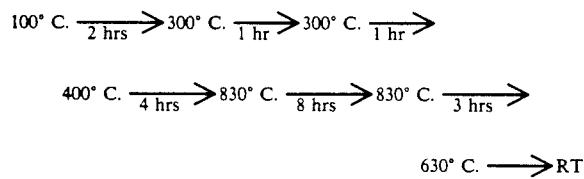

Analysis of this crystalline dysprosium aluminum borate by powder X-ray diffraction pattern of high crystallinity found about 60 percent Dy$_2$O$_3$·2 Al$_2$O$_3$·4 B$_2$O$_3$ and about 40 percent Dy$_2$O$_3$·3 Al$_2$O$_3$·4 B$_2$O$_3$.

EXAMPLE 23

A 0.98 g sample of crystalline dysprosium aluminum 30 borate from Example 22 (18-35 mesh powder) was prepared for testing as a catalyst by admixing with 0.3 mL of 18/35 mesh alpha alumina, an inert diluent. This mixture of solids was then tested by the procedure described hereinabove. Initially, the catalyst was conditioned for ¾ hour at 300° C. under nitrogen, and for ¾ hour at 500° C. under nitrogen.

At a temperature of 500° C., a gas flow (8% oxygen in nitrogen) of 0.097 mL/sec, and an ethanol flow of 0.00234 mL/sec, the results were:
Conversion of ethanol 94%
Selectivity to ethylene 72%. At a temperature of 500° C., a gas flow (8% oxygen in nitrogen) of 0.097 mL/sec, and a 2-butanol flow of 0.00234 mL/min, we obtained the following results:
Conversion of 2-butanol 100%
Selectivity to C$_4$ olefins 87%

EXAMPLE 24

A crystalline dysprosium aluminum borate was prepared as follows: Into a blender is placed boric acid (10.4 g, 0.17 mol) dissolved in 38 mL hot deionized water, PHF alumina sol (519.3 g of 6.6% alumina, 0.34 mol) and Dy(N$_3$)$_3$—5H$_2$O (24.6 g, 0.056 mol) dissolved in 38 mL deionized water. The mixture was blended at a low setting, and 11 mL ammonium hydroxide was added. The solution became so thick that another 10 mL of water was added. The mixture was stirred and blended for several minutes. The gel was removed and placed on a 35 cm×45 cm plastic tray for drying. The solid was placed in a vacuum oven for 48 hours (0.3 atm, 120° C.). The material was calcined at 930° C.

The white crystalline dysprosium aluminum borate had a BET surface area of 25 m$^2$/g. Analysis of this crystala line dysprosium aluminum borate by powder X-ray diffraction pattern of high crystallinity found about 10 percent Dy$_2$O$_3$·2 Al$_2$O$_3$·4 B$_2$O$_3$ and about 90 percent Dy$_2$O$_3$·3 Al$_2$O$_3$·4 B$_2$O$_3$.

EXAMPLE 25

A 0.56 g sample of crystalline dysprosium aluminum borate from Example 24 (18-35 mesh powder) was prepared for testing as a catalyst by admixing with 0.3 mL of 18/35 mesh alpha alumina, an inert diluent. This mixture of solids was then tested by the procedure described hereinabove. Initially, the catalyst was conditioned for one hour at 300° C. under nitrogen, and for one hour at 500° C. under nitrogen.

At a temperature of 600° C., a gas flow (8% oxygen in nitrogen) of 0.109 mL/sec, and a propane flow of 0.0094 mL/sec, the results were:
Conversion of propane 14%
Selectivity to propene 44%. At a temperature of 500° C., a gas flow (8% oxygen in nitrogen) of 0.109 mL/sec, and an ethanol flow of 0.00234 mL/min, the results were:
Conversion of ethanol 77%
Selectivity to ethylene 40%
Selectivity to acetic acid 10%. At a temperature of 400° C., a gas flow (8% oxygen in nitrogen) of 0.109 mL/sec, and a 2-butanol flow of 0.00234 mL/min, the results were:
Conversion of 2-butanol 99%
Selectivity to C$_4$ olefins 100%. At a temperature of 600° C., a gas flow (8% oxygen in nitrogen) of 0.109 mL/sec, an ammonia flow of 0.013 mL/min, and a toluene flow of 0.00234 mL/min, the results were:
Conversion of toluene 25%
Selectivity to benzonitrile 87%. At a temperature of 600° C., a gas flow (nitrogen) of 0.200 mL/sec, and a liquid cumene flow at 0.00328 mL/min, the results were:
Conversion of cumene 17%
Selectivity to alpha methylstyrene 95%

A crystalline terbium aluminum borate was prepared as follows: Boric acid (28.4 g, 0.46 mol) dissolved in 150 mL warm deionized water, PHF alumina sol (131.2 g of 8.9% alumina, 0.114 mol) and Tb(NO$_3$)$_3$—6H$_2$O dissolved in 250 mL of warm deionized water were placed into a blender. The aqueous mixture was blended forming a thin gel, the pH of which measured 4. After 9 mL of ammonium hydroxide was added to the mixture a thick gel formed the pH of which measured 5. The gel was air-dried, and vacuum-dried for 6 hours (0.3 atm, 120° C.). The dried material, 79.6 g, was heated in air at 400° C. for 6 hours and was calcined according to the following program:

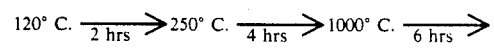

Analysis of this crystalline terbium aluminum borate by powder X-ray diffraction pattern of high crystallinity found about 10 percent $Tb_2O_3 \cdot 2\ Al_2O_3 \cdot 4\ B_2O_3$.

A second portion of the dry material was calcined according to the following program:

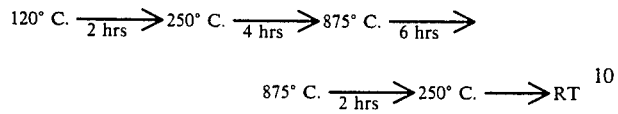

The BET surface area of the calcined material was determined to be 0.8 m2/g. Analysis of this crystalline dysprosium aluminum borate by powder X-ray diffraction pattern of high crystallinity found about 75 percent $Tb_2O_3 \cdot 2\ Al_2O_3 \cdot 4\ B_2O_3$ and about 25 percent $Tb_2O_3 \cdot 3\ Al_2O_3 \cdot 4\ B_2O_3$.

The powder X-ray diffraction lines for the resulting crystalline terbium aluminum borate are set out below:

| XRD Lines for Example 26 | | |
|---|---|---|
| Interplanar Spacing d,[1] Å | Assigned Strength[2] | Relative Intensity |
| 9.42 | W | 16 |
| 4.98 | VW | 6 |
| 4.65 | W | 16 |
| 4.45 | VW | 8 |
| 4.03 | VW | 7 |
| 3.98 | VW | 8 |
| 3.65 | VS | 100 |
| 3.55 | M | 28 |
| 3.33 | W | 23 |
| 3.01 | S | 70 |
| 2.82 | VW | 8 |
| 2.71 | M | 32 |
| 2.66 | M | 27 |
| 2.43 | W | 22 |
| 2.33 | W | 10 |
| 2.29 | W | 18 |
| 2.22 | VW | 11 |
| 2.05 | W | 14 |
| 1.99 | W | 21 |
| 1.94 | W | 14 |
| 1.84 | M | 36 |
| 1.82 | W | 20 |
| 1.47 | VW | 7 |
| 1.43 | VW | 8 |

[1]Angstroms
[2]VW = very weak; W = weak; M = medium; S = strong; VS = very strong

EXAMPLE 27

A crystalline gadolinium aluminum borate was prepared as follows: A hot solution of boric acid (32.8 g, 0.54 mol, a 10% excess) in 200 mL distilled water was added to alumina sol (149.3 g of a 8.2% alumina sol, 0.12 mol) in a Waring blender while mixing. To this was added a hot solution containing $Gd(NO_3)_3 - 5H_2O$ (52.0 g, 0.12 mol) in 15 mL of distilled water. After thorough mixing, a homogeneous gel formed the pH of which measured 3. Mixing was continued until a smooth and uniform white product was obtained. The gel was air-dried, vacuum-dried at 120° C. and pre-calcined to 400° C. A portion of this material was calcined at 900° C. The calcined material emitted fluorescence when illuminated by U.V. Analysis of this crystalline gadolinium aluminum borate by powder X-ray diffraction pattern of high crystallinity found about 90 percent $Gd_2O_3 \cdot 2\ Al_2O_3 \cdot 4\ B_2O_3$ and about 10 percent $Gd_2O_3 \cdot 3\ Al_2O_3 \cdot 4\ B_2O_3$.

The powder X-ray diffraction lines for the resulting crystalline gadolinium aluminum borate are set out below:

| XRD Lines for Example 27 | | |
|---|---|---|
| Interplanar Spacing d,[1] Å | Assigned Strength[2] | Relative Intensity |
| 9.25 | M | 41 |
| 5.41 | VW | 8 |
| 4.94 | VW | 9 |
| 4.61 | W | 23 |
| 3.96 | W | 15 |
| 3.64 | VS | 100 |
| 3.33 | VW | 8 |
| 3.00 | S | 64 |
| 2.43 | W | 23 |
| 2.80 | VW | 8 |
| 2.71 | VW | 11 |
| 2.70 | W | 13 |
| 2.66 | VW | 8 |
| 2.28 | W | 19 |
| 2.22 | VW | 10 |
| 2.04 | VW | 10 |
| 1.99 | W | 19 |
| 1.98 | W | 16 |
| 1.93 | W | 13 |
| 1.83 | W | 20 |
| 1.82 | VW | 12 |
| 1.50 | VW | 5 |
| 1.43 | VW | 8 |
| 1.42 | VW | 8 |

[1]Angstroms
[2]VW = very weak; W = weak; M = medium; S = strong; VS = very strong A small portion of the powder was examined for second harmonic generation efficiency using a Q-switched mode locked YAG laser operating at 1060 nm. Green light was observed from most of the crystals, which was bright in spots. This indicates the frequency doubling character of the crystals.

EXAMPLE 29

Another example of crystalline gadolinium aluminum borate was prepared as follows: Boric acd (26.1 g, 0.35 mol) dissolved in 110 mL hot deionized water, PHF alumina sol (206.7 g of 7.8% alumina, 0.158 mol) and $Gd(NO_3)_3 - 5H_2O$ (45.7 g, 0.106 mol) dissolved in 50 mL deionized water were placed into a blender. The mixture was blended at a low setting, and 18 mL ammonium hydroxide was added to obtain a gel which was blended for several minutes. The gel was air-dried, vacuum-dried for one week (0.3 atm, 110° C.), and calcined using the following program:

$$200°\ C. \xrightarrow{2\ hrs} 300°\ C. \xrightarrow{1\ hr} 300°\ C. \xrightarrow{1\ hr}$$

$$400°\ C. \xrightarrow{4\ hrs} 900°\ C. \xrightarrow{10\ hrs} 900°\ C. \xrightarrow{5\ hrs}$$

$$600°\ C. \longrightarrow$$

Analysis of this very light pink gadolinium aluminum borate by powder X-ray diffraction pattern of high crystallinity found about 10 percent $Gd_2O_3 \cdot 2\ Al_2O_3 \cdot 4\ B_2O_3$ and about 90 percent $Gd_2O_3 \cdot 3\ Al_2O_3 \cdot 4\ B_2O_3$. The BET surface area of the calcined material measured 8.7 m2/g.

EXAMPLE 30

A 1.09 g sample of crystalline gadolinium aluminum borate from Example 29 (18-35 mesh powder) was prepared for testing as a catalyst by admixing with 0.3 mL of 18/35 mesh alpha alumina, an inert diluent. This mixture of solids was then tested by the procedure described hereinabove. Initially, the catalyst was conditioned for one hour at 300° C. under nitrogen, and for one hour at 500° C. under nitrogen.

At a temperature of 600° C., a gas flow (8% oxygen in nitrogen) of 0.097 mL/sec, and a propane flow of 0.094 mL/sec, the results were:
Conversion of propane 44%
Selectivity to propene 43%

At a temperature of 500° C., a gas flow (8% oxygen in nitrogen) of 0.097 mL/sec, and an ethanol flow of 0.00234 mL/min, the results were:
Conversion of ethanol 98%
Selectivity to acetaldehyde 32%
Selectivity to ethylene 50%

At a temperature of 600° C., a gas flow (8% oxygen in nitrogen) of 0.097 mL/sec, and a 2-butanol flow of 0.00234 mL/min, the results were:
Conversion of 2-butanol 100%
Selectivity to methyl ethyl ketone 25%
Selectivity to $C_4$ olefins 69%

At temperature of 500° C., a gas flow (8% oxygen in nitrogen) of 0.321 mL/sec, and an ammonia flow of 0.013 mL/min, and a liquid toluene flow of 0.00234 mL/min, the results were:
Conversion of toluene 15%
Selectivity to benzonitrile 87%

EXAMPLE 31

A crystalline europium aluminum borate was prepared as follows: Boric acid (21.3 g, 0.344 mol) dissolved in 110 mL warm deionized water, PHF alumina sol (93.3 g of (5% alumina, 0.087 mol) and Eu($NO_3$)$_3$—6$H_2O$ dissolved in 35 mL of warm deionized water were placed into a blender. The mixture was blended at a low setting to obtain a thin gel. The pH of this gel measured 4. Upon addition of 8 mL ammonium hydroxide and subsequent blending, the mixture became a thick gel. The final pH of the gel measured 6. The gel was removed and placed onto a 35 cm×45 cm plastic tray and air-dried. The solid (51.3 g) was placed into a vacuum oven overnight (0.3 atm, 106° C.). The vacuum-dried solid material weighed 41.6 g. A 13.0 g portion of the material was calcined using the following program:

$$120° C. \xrightarrow{2 \text{ hrs}} 250° C. \xrightarrow{4 \text{ hrs}} 825° C. \xrightarrow{8 \text{ hrs}}$$

$$825° C. \xrightarrow{2 \text{ hrs}} 250° C. \longrightarrow RT$$

The calcined material weighed 7.51 g. Analysis of this europium aluminum borate by powder X-ray diffraction pattern of high crystallinity found about 80 percent $Eu_2O_3 \cdot 2 Al_2O_3 \cdot 4 B_2O_3$ and about 20 percent $Eu_2O_3 \cdot 3 Al_2O_3 \cdot 4 B_2O_3$.

A second portion (7.50 g) was calcined using the following program:

$$120° C. \xrightarrow{2 \text{ hrs}} 250° C. \xrightarrow{4 \text{ hrs}} 1000° C. \xrightarrow{8 \text{ hrs}}$$

$$1000° C. \xrightarrow{4 \text{ hrs}} 125° C. \longrightarrow RT$$

This calcined material weighs 6.16 g and emitted fluorescence when illuminated by U.V. Analysis of this europium aluminum borate by powder X-ray diffraction pattern of high crystallinity found about 100 percent $Eu_2O_3 \cdot 2 Al_2O_3 \cdot 4 B_2O_3$. The powder X-ray diffraction lines for the resulting crystalline europium aluminum borate are set out below:

| XRD Lines for Example 31 | | |
|---|---|---|
| Interplanar Spacing d,[1] Å | Assigned Strength[2] | Relative Intensity |
| 9.22 | VW | 3 |
| 4.60 | W | 15 |
| 3.94 | VW | 11 |
| 3.62 | VS | 100 |
| 2.99 | S | 89 |
| 2.42 | M | 32 |
| 2.27 | M | 28 |
| 2.20 | W | 13 |
| 1.98 | M | 37 |
| 1.97 | M | 29 |
| 1.92 | M | 26 |
| 1.82 | M | 41 |
| 1.81 | M | 28 |
| 1.53 | VW | 5 |
| 1.49 | VW | 8 |
| 1.47 | VW | 12 |
| 1.43 | W | 17 |
| 1.42 | W | 16 |

[1] Angstroms
[2] VW = very weak; W = weak; M = medium; S = strong; VS = very strong

EXAMPLE 32

A crystalline samarium aluminum borate was prepared as follows: A hot solution of boric acid (32.8 g, 0.54 mol, a 10% excess) in 200 mL distilled water was added to alumina sol (149.3 g of an 8.2% alumina sol, 0.12 mol) in a Waring blender while mixing. A hot solution of Sm($NO_3$)$_3$—5$H_2O$ (51.1 g, 0.12 mol) in 15 mL of distilled water was added to the mixture. After thorough mixing, the gel was sufficiently thick that no ammonium hydroxide was added. Mixing was continued until a smooth and uniform pale yellow product was obtained. The pH of the gel was 3. The gel was air-dried, vacuum-dried 120° C., and precalcined to 400° C. A portion of this material was calcined at 975° C. The calcined material emitted fluorescence when illuminated by U.V. Analysis of this very light pink gadolinium aluminum borate by powder X-ray diffraction pattern of high crystallinity found about 70 percent $Sm_2O_3 \cdot 2 Al_2O_3 \cdot 4 B_2O_3$ and about 30 percent $Sm_2O_3 \cdot 3 Al_2O_3 \cdot 4 B_2O_3$. The powder X-ray diffraction lines of this crystalline samarium aluminum borate are set out below:

| XRD Lines for Example 32 | | |
|---|---|---|
| Interplanar Spacing d,[1] Å | Assigned Strength[2] | Relative Intensity |
| 9.34 ± 0.25 | W | 19 |
| 4.64 ± 0.15 | W | 20 |
| 3.96 ± 0.10 | VW | 10 |
| 3.64 ± 0.10 | VS | 100 |
| 3.01 ± 0.10 | S | 71 |

-continued

| XRD Lines for Example 32 | | |
|---|---|---|
| Interplanar Spacing d,[1] Å | Assigned Strength[2] | Relative Intensity |
| 2.43 ± 0.08 | W | 23 |
| 2.28 ± 0.05 | W | 15 |
| 2.22 ± 0.05 | VW | 6 |
| 2.05 ± 0.04 | VW | 9 |
| 1.97 ± 0.04 | VW | 9 |
| 1.93 ± 0.04 | VW | 11 |
| 1.83 ± 0.04 | W | 19 |

[1]Angstroms
[2]VW = very weak; W = weak; M = medium; S = strong; VS = very strong

EXAMPLE 33-2

A small portion of the powder was examined for second harmonic generation efficiency using a Q-switched mode locked YAG laser operating at 1060 nm. Green light was observed from most of the crystals, which was bright in spots. This indicates the frequency doubling character of the crystals.

EXAMPLE 34

A crystalline neodymium aluminum borate was prepared as follows: Boric acid (32.8 g, 0.531 mol, a 10% excess) dissolved in 200 mL warm deionized water, PHF alumina sol (149.3 g of 8.2% alumina, 0.12 mol) and $Nd(NO_{63})_3-5H_2O$ (50.4 g, 0.12 mol) dissolved in 100 mL deionized water were placed into a blender. The mixture was blended at a low setting. Upon setting the mixture became a thick lavender gel which was air-dried, and vacuum-dried (0.3 atm, 100° C.) overnight to obtain a dry solid.

EXAMPLE 35

A first portion of the dry solid from Example 34 was calcined at 975° C. in air. The calcined material emitted fluorescence when illuminated by U.V. Analysis of the resulting crystalline neodymium aluminum borate by powder X-ray diffraction pattern found about 90 percent $Nd_2O_3 \cdot 2 Al_2O_3 \cdot 4 B_2O_3$ and about 10 percent $Nd_2O_3 \cdot 3 Al_2O_3 \cdot 4 B_2O_3$.

A 0.68 g sample (18–35 mesh powder) of this crystalline neodymium aluminum borate was prepared for testing as a catalyst by admixing with 0.3 mL of 18/35 mesh alpha alumina, an inert diluent. This mixture of solids was then tested by the procedure described hereinabove. Initially, the catalyst was conditioned for 45 minutes at 300° C. under a stream of nitrogen.

At a temperature of 500° C., a gas flow (8% oxygen in nitrogen) of 0.109 mL/sec, and an ethanol flow of 0.00234 mL/min, the results were:
Conversion of ethanol 88%
Selectivity to ethylene 77%

EXAMPLE 36

A second portion of the dry solid from Example 43 was calcined at 1150° C. Analysis of the resulting crystalline neodymium aluminum borate by powder X-ray diffraction pattern found about 100 percent $Nd_2O_3 \cdot 3 Al_2O_3 \cdot 4 B_2O_3$.

A sample of this calcined material was prepared for catalytic studies as described above in Example 35.

At a temperature of 500° C., a gas flow (8% oxygen in nitrogen) of 0.109 mL/sec, and an ethanol flow of 0.00234 mL/min, the results were:
Conversion of ethanol 63%
Selectivity to acetaldehyde 75%

At a temperature of 500° C., a gas flow (8% oxygen in nitrogen) of 0.109 mL/sec, and a 2-butanol flow at 0.00234 mL/min, the results were:
Conversion of 2-butanol 66%
Selectivity to methyl ethyl ketone 77%

These data demonstrate significant chemical differences between material containing crystalline $(Nd_2O_3) \cdot 2(Al_2O_3) \cdot 4(B_2O_3)$ and material containing crystalline $(Nd_2O_3) \cdot 3(Al_2O_3) 4(B_2O_3)$.

EXAMPLE 37

Another portion of the crystalline $(Nd_2O_3) \cdot 2(Al_2O_3) \cdot 4(B_2O_3)$ from Example 35 was treated with warm nitric acid diluted with water (1:1) and dried. This dry material was prepared for catalytic studies as described above in Example 35 above.

At a temperature of 500° C., a gas, flow (8% oxygen in nitrogen) of 0.109 mL/sec, and an ethanol flow at 0.00234 mL/min, the results were:
Conversion of ethanol 85%
Selectivity to acetaldehyde 68%

EXAMPLE 38

A portion of the crystalline $(Nd_2O_3) \cdot 3(Al_2O_3) \cdot 4(B_2O_3)$ from Example 36 was treated with warm nitric acid as described in Example 37 above and prepared for catalytic studies as described above in Example 35.

At a temperature of 500° C., a gas flow (8% oxygen in nitrogen) of 0.109 mL/sec, and an ethanol flow at 0.00234 mL/min, the results were:
Conversion of ethanol 50%
Selectivity to acetaldehyde 73%

EXAMPLE 39

A small portion of the crystalline $(Nd_2O_3) \cdot 2(Al_2O_3) \cdot 4(B_2O_3)$ from Example 35 was leached with warm nitric acid as described in Example 37 above and examined for second harmonic generation efficiency using a Q-switched mode locked YAG laser operating at 1060 nm. Green light was observed from most of the crystals. This indicates the frequency-doubling character of the crystals.

EXAMPLE 40

Another crystalline neodymium aluminum borate example was prepared as follows: Boric acid (40.2 g, 0.65 mol) dissolved in 200 mL warm deionized water, PHF alumina sol (319 g of 7.8% alumina, 0.243 mol) and $Nd(NO_3)_3-5H_2O$ (68.3 g, 0.163 mol) dissolved in 100 mL deionized water were placed into a blender. The mixture was blended at a low setting and 25 mL of warm concentrated ammonium hydroxide was added. While the mixture was stirred and blended for several minutes the mixture became a thick gel. The gel was air-dried, and then vacuum-dried (0.3 atm, 110° C.) overnight.

EXAMPLE 41

A first portion of the dry material from Example 40 was calcined using the following program:

$$25° C. \xrightarrow{1 hr} 300° C. \xrightarrow{2 hrs} 300° C. \xrightarrow{1 hr}$$

$$400° C. \xrightarrow{2 hrs} 400° C. \xrightarrow{4 hrs} 850° C. \xrightarrow{10 hrs}$$

$$850°\text{C.} \xrightarrow{15 \text{ hrs}} 200$$

The BET surface area of this calcined material measured 0.5 m²/g. Analysis of the resulting crystalline neodymium aluminum borate by powder X-ray diffraction pattern found about 30 percent $Nd_2O_3 \cdot 2 Al_2O_3 \cdot 4 B_2O_3$ and about 70 percent $Nd_2O_3 \cdot 3 Al_2O_3 \cdot 4 B_2O_3$.

A 1.02 g sample (18–35 mesh powder) the crystalline neodymium aluminum borate was prepared for testing as a catalyst by mixing with 0.3 mL of 18/35 mesh alpha alumina, an inert diluent. This mixture of solids was then tested by the procedure described hereinabove. Initially, the catalyst was conditioned under nitrogen at 300° C. for one hour and at 500° C. for one hour.

At a temperature of 500° C., a gas flow (8% oxygen in nitrogen) of 0.101 mL/sec, and an ethanol flow of 0.00234 mL/min, the results were:
Conversion of ethanol 75%
Selectivity to acetaldehyde 42%
Selectivity to ethylene 43%

At a temperature of 500° C., a gas flow (8% oxygen in nitrogen) of 0.101 mL/sec, and a 2-butanol flow at 0.00234 mL/min, the results were:
Conversion of 2-butanol 100%
Selectivity to $C_4$ olefins 67%

At a temperature of 650° C., a gas flow (nitrogen) of 0.200 mL/sec, and a liquid cumene flow at 0.00328 mL/min, the results were:
Conversion of cumene 19%
Selectivity to alpha-methylstyrene 48%

EXAMPLE 42

A second portion of the dry material from Example 40 was calcined to 1220° C. The resulting crystalline neodymium aluminum borate was analyzed by its powder X-ray diffraction pattern which indicated a pure $(Nd_2O_3) \cdot 3(Al_2O_3) \cdot 4(B_2O_3)$ was obtained. The BET surface area decreased to below 0.2 m²/g. A 0.95 g sample of this pure $(Nd_2O_3) \cdot 3(Al_2O_3) \cdot 4(B_2O_3)$ was screened for catalytic activity described in Example 8 above.

At a tepperature of 500° C., a gas flow (8% oxygen in nitrogen) of 0.097 mL/sec, and an ethanol flow of 0.00234 mL/min, the results were:
Conversion of ethanol 55%
Selectivity to acetaldehyde 77%

At a temperature of 600° C., a gas flow (nitrogen) of 0.200 mL/sec, and a liquid cumene flow at 0.00328 mL/min, the results were:
Conversion of cumene 2%
Selectivity to alpha-methylstyrene 67%

EXAMPLE 43

A crystalline praseodymium aluminum borate was prepared as follows: Into a blender is placed boric acid (27.0 g, 0.437 mol) dissolved in 130 mL warm deionized water, PHF alumina sol (214.2 g of 7.8% alumina, 0.164 mol) and $Pr(NO_3)_3 - 5H_2O$ (46.1 g, 0.109 mL water. The mixture was blended at a low setting, and 12 mL ammonium hydroxide was added. The solution became thick and the mixture was stirred and blended for several minutes. The gel was air-dried, and then vacuum-dried for 48 hours (0.3 atm, 120° C.). The dry material calcined using the following program:

$$100°\text{C.} \xrightarrow{6.7 \text{ hrs}} 500°\text{C.} \xrightarrow{3 \text{ hrs}} 865°\text{C.} \xrightarrow{8 \text{ hrs}}$$

$$865°\text{C.} \xrightarrow{1.7 \text{ hrs}} 650°\text{C.} \longrightarrow \text{RT}$$

The resulting solid material emitted fluorescence when illuminated by U.V. This crystalline praseodymium aluminum borate was analyzed by its powder X-ray diffraction pattern to contain pure crystalline $(Pr_2O_3) \cdot 2(Al_2O_3) \cdot 4(B_2O_3)$.

EXAMPLE 44

A 0.93 g sample (18–35 mesh powder) of the above compound was prepared for testing as a catalyst by admixing with 0.3 mL of 18/35 mesh alpha alumina, and inert diluent. This mixture of solids was then tested by the procedure described hereinabove. Initially, the catalyst was conditioned under nitrogen for one hour at 300° C., followed by an additional hour at 500° C.

At a temperature of 500° C., a gas flow (8% oxygen in nitrogen) of 0.109 mL/sec, and an ethanol flow at 0.00234 mL/min, the results were:
Conversion of ethanol 95%
Selectivity to ethylene 67%

At a temperature of 500° C., a gas flow (8% oxygen in nitrogen) of 0.109 mL/sec, and a 2-butanol flow of 0.00234 mL/min, the results were:
Conversion of 2-butanol 100%
Selectivity to $C_4$ olefins 90%

EXAMPLE 45

Another example of a crystalline praseodymium aluminum borate was prepared as follows: A hot solution of boric acid (32.8 g, 0.54 mol, a 10% excess) in 200 mL distilled water was added to alumina sol (149.3 g of an 8.2% alumina sol, 0.12 mol) in a Waring blender while mixing. A hot solution of $Pr(NO_3)_3 - 5H_2O$ (50.0 g, 0.12 mol) in 15 mL of deionized water was added to the mixture. Mixing was continued until a smooth and uniform sea-green gel was obtained. The gel was air-dried, vacuum-dried, and precalcined to 400° C. A portion of this material was calcined at 900° C. The material was characterized by X-ray diffraction in which the $(Pr_2O_3) \cdot 2(Al_2O_3) \cdot 4(B_2O_3)$ phase was identified.

EXAMPLE 46

A small portion of the crystalline $(Pr_2O_3) \cdot 2Al_2O_3) \cdot 4(B_2O_3)$ from Example 45 was examined for second harmonic generation efficiency using a Q-switched mode locked YAG laser operating at 1060 nm. Green light was observed from most of the crystals.

EXAMPLE 47

A crystalline cerium aluminum borate having an X-ray diffraction pattern comprising significant lines substantially as described in Table I was prepared as follows: Boric acid (40.6 g, 0.657 mol) dissolved in 200 mL warm deionized water, PHF alumina sol (321.7 g of 7.8% alumina, 0.246 mol) and $Ce(NH_4)_2(NO_3)_6$ (89.9 g, 0.164 mol) dissolved in 100 mL deionized water were placed into a blender. While the mixture was blended at a low setting, 25 mL of ammonium hydroxide was added. As the mixture was stirred and blended for several minutes, it became a thick gel. The gel was air-dried, vacuum-dried (0.3 atm, 110° C.) overnight, and calcined using the following program:

$$25°\text{ C.} \xrightarrow{1.5\text{ hrs}} 300°\text{ C.} \xrightarrow{1\text{ hr}} 300°\text{ C.} \xrightarrow{1\text{ hr}}$$

$$400°\text{ C.} \xrightarrow{4\text{ hrs}} 820°\text{ C.} \xrightarrow{10\text{ hrs}} 820°\text{ C.} \xrightarrow{2.6\text{ hrs}}$$

$$600°\text{ C.} \longrightarrow \text{RT}$$

The material resulting from this calcination was amorphous. A portion of the amorphous material was further calcined at 1020° C. for 8 hours to obtain a crystalline cerium aluminum borate. Analysis of the resulting crystalline cerium aluminum borate by powder X-ray diffraction pattern found about 50 percent $Ce_2O_3\cdot 2\ Al_2O_3\cdot 4\ B_2O_3$ and about 50 percent $Nd_2O_3\cdot 3\ Al_2O_3\cdot 4\ B_2O_3$. The BET surface area of this cerium aluminum borate measured $5.0 m^2/g$.

EXAMPLE 48

A 1.09 g sample (18-35 mesh powder) of crystalline cerium aluminum borate from Example 47 was prepared for testing a catalyst by admixing with 0.3 mL of 18/35 mesh alpha alumina, an inert diluent. This mixture of solids was then tested by the procedure described hereinabove. Initially, the catalyst was conditioned nitrogen for one hour at 300° C., and then at 500° C. under nitrogen for one hour.

At a temperature of 500° C., a gas flow (8% oxygen in nitrogen) of 0.097 mL/sec, and an ethanol flow of 0.00234 mL/min, the results were:
Conversion of ethanol 66%
Selectivity to acetaldehyde 85%

At a temperature of 500° C., a gas flow (8% oxygen in nitrogen) of 0.097 mL/sec, and a 2-butanol flow of 0.00234 mL/min, the results were:
Conversion of 2-butanol 88%
Selectivity to methyl ethyl ketone 84%

At a temperature of 500° C., a gas flow (8% oxygen in nitrogen) of 0.310 mL/sec, an ammonia flow of 0.013 mL/min, and a liquid toluene flow of 0.00234 mL/min, the results were:
Conversion of toluene 9%
Selectivity to benzonitrile 57%

EXAMPLE 49

Another crystalline cerium aluminum borate was prepared as follows: A hot solution of boric acid (32.8 g, 0.54 mol, a 10% excess) in 200 mL distilled water was added to alumina sol (149.3 g of a 8.2% alumina sol, 0.12 mol) in a Waring blender while mixing. To this was added a hot solution containing $Ce(NH_4)_2(NO_3)_6$ (65.8 g, 0.12 mol) in 15 mL of distilled water. After thorough mixing, 20 mL of ammonium hydroxide solution (1:1 concentrated $NH_4OH$ and distilled water) was added to obtain a thin homogeneous gel whose final pH is 4. Mixing was continued until a smooth and uniform yellow-orange gel was obtained. The gel was air-dried, vacuum-dried at 120° C., and precalcined to 400° C. A portion of the dry material was calcined at 975° C. The resulting material emitted fluorescence when illuminated by U.V. Analysis of the crystalline cerium aluminum borate by powder X-ray diffraction pattern found 90+ percent $Ce_2O_3\cdot 2\ Al_2O_3\cdot 4\ B_2O_3$.

EXAMPLE 50

A small portion of the crystalline $(Ce_2O_3)\cdot 2(Al_2O_3)\cdot 4(B_2O_3)$ from Example 49 was examined for second harmonic generation efficiency using a Q-switched mode locked YAG laser operating at 1060 nm. Green light was observed from most of the crystals, which was bright in spots. This indicates the frequency doubling character of the crystals.

EXAMPLE 51

A crystalline lanthanum aluminum borate was prepared as follows: A hot solution of boric acid (32.8 g, 0.54 mol, a 10% excess) in 200 mL distilled water was added to alumina sol (149.3 g of a 8.2% alumina sol, 0.12 mol) in a Waring blender while mixing. To this was added a hot solution containing $La(NO_3)_3-6H_2O$ (52.0 g, 0.12 mol) in 15 mL of distilled water. After thorough mixing, a gel was obtained. The pH of the gel was 3. Mixing was continued until a smooth and uniform white product was obtained. The gel was air-dried, vacuum-dried at 120° C., and pre-calcined to 400° C. A portion of this material was calcined when illuminated by U.V. Analysis of the crystalline lanthanum aluminum borate by powder X-ray diffraction pattern found about 100 percent $La_2O_3\cdot 2\ Al_2O_3\cdot 4\ B_2O_3$.

EXAMPLE 52

A small portion of the crystalline $(La_2O_3)\cdot 2(Al_2O_3)\cdot 4(B_2O_3)$ from Example 51 was examined for second harmonic generation efficiency using a Q-switched mode locked YAG laser operating at 1060 nm. Green light was observed from most of the crystals. This indicates the frequency doubling character of the crystals.

We claim:

1. A crystalline material comprising aluminum, boron, oxygen and at least one element selected from the group consisting of Group IIIB of the Periodic Table having effective ionic radii less than 0.98 Angstroms at valence 3+ and coordination number VI having an X-ray diffraction pattern comprising significant lines substantially as set forth below:

| Interplanar Spacing d, Angstroms | Assigned Strength |
| --- | --- |
| 9.15 ± 0.25 | Medium-Strong |
| 4.57 ± 0.15 | Weak-Medium |
| 3.62 ± 0.10 | Very Strong |
| 2.98 ± 0.08 | Strong |
| 2.41 ± 0.05 | Weak |
| 2.28 ± 0.05 | Weak |
| 1.98 ± 0.04 | Weak |
| 1.82 ± 0.04 | Weak |

2. The composition of claim 1 and a binder.

3. The composition of claim 1 comprising the crystalline material and from about 0.05 to about 50 wt % of at least one metallo element selected from the group consisting of Groups IA, IIA, IIB, VIB and VIII of the Periodic Table based on the weight of crystalline material.

4. The composition of claim 1 wherein the crystalline material has the empirical formula $LnAl_{1.67\pm 0.67X}(B_4O_{10})O_X$, Ln is at least one rare earth element ion and X is a number ranging from 0 to 1.

5. The composition of claim 4 wherein Ln comprises lutetium.

6. The composition of claim 4 wherein Ln comprises ytterbium.

7. The composition of claim 4 wherein Ln comprises thulium.

8. The composition of claim 4 wherein Ln comprises erbium.

9. The composition of claim 4 wherein Ln comprises holmium.

10. The composition of claim 4 wherein Ln comprises yttrium.

11. The composition of claim 4 wherein Ln comprises dysprosium.

12. The composition of claim 4 wherein Ln comprises terbium.

13. The composition of claim 4 wherein Ln comprises gadolinium.

14. The composition of claim 4 wherein Ln comprises europium.

15. The composition of claim 4 wherein Ln comprises samarium.

16. The composition of claim 4 wherein Ln comprises promethium.

17. The composition of claim 5 wherein the crystalline material has the empirical formula $LuAl_2B_4O_{10.5}$ 18. The composition of claim 6 wherein the crystalline material has the empirical formula $YbAl_2B_4O_{10.5}$ 19. The composition of claim 7 wherein the crystalline line material has the empirical formula $TmAl_2B_4O_{10.5}$ 20. The composition of claim 8 wherein the crystalline material has the empirical formula $ErAl_2B_4O_{10.5}$ 21. The composition of claim 9 wherein the crystalline material has the empirical formula $HoAl_2B_4O_{10.5}$ 22. The composition of claim 10 wherein the crystalline material has the empirical formula $YAl_2B_4O_{10.5}$ 23. The composition of claim 11 wherein the crystalline material has the empirical formula $DyAl_2B_4O_{10.5}$ 24. The composition of claim 12 wherein the crystalline material has the empirical formula $TbAl_2B_4O_{10.5}$ 25. The composition of claim 13 wherein the crystalline material has the empirical formula $GdAl_2B_4O_{10.5}$ 26. The composition of claim 14 wherein the crystalline material has the empirical formula $EuAl_2B_4O_{10.5}$ 27. The composition of claim 15 wherein the crystalline line material has the empirical formula $SmAl_2B_4O_{10.5}$ 28. The composition of claim 16 wherein the crystalline material has the empirical formula $PmAl_2B_4O_{10.5}$ 29. The process of making the crystalline material of claim 1 which comprises dispersing in a liquid medium a source of alumina, a source of boria, and a source of at least one Group IIIB element ion selected from the group consisting of lutetium(III), ytterbium(III), thulium(III), erbium(III), holmium(III), yttrium(III), dysprosium(III), terbium(III), gadolinium(III), europium(III), samarium(III), and promethium(III) ions to form a mixture, removing substantially all the liquid from the mixture to form a superficially dry solid, and calcining the superficially dry solid at a temperature in a range from about 600° to about 1500° C.

30. The process of claim 29, wherein the molar ratio of the source of Group IIIB element ions to the source of boria, in terms of oxides calculated as $Ln_2O_3/B_2O_3$, is about 0.02 to about 1, and the molar ratio of the source of alumina to the source of boria, in terms of oxides calculated as $Al_2O_3/B_2O_3$, is about 0.1 to about 4.

31. The process of claim 30, wherein the $Ln_2O_3/B_2O_3$ molar ratio is about 0.05 to about 0.82, the $Al_2O_3/B_2O_3$ mole ratio is about 0.25 to about 2.33, and the pH of the mixture is in a range from about 2 to about 10.

32. The process of making the crystalline material of claim 5, which comprises forming an aqueous composition comprising a source of lutetium(III) ions, a source of alumina, and a source of boria, at a pH in a range from about 3 to about 9, drying the composition to form a superficially dry solid, and calcining the dry solid at a temperature in a range from about 700° to about 1100° C. to form said crystalline material.

33. The process of making the crystalline material of claim 6, which comprises forming an aqueous composition comprising a source of ytterbium(III) ions, a source of alumina, and a source of boria, at a pH in a range from about 3 to about 9, drying the composition to form a superficially dry solid, and calcining the dry solid at a temperature in a range from about 700° to about 1100° C. to form said crystalline material.

34. The process of making the crystalline material of claim 7, which comprises forming an aqueous composition comprising a source of thulium(III) ions, a source of alumina, and a source of boria at a pH in a range from about 3 to about 9, drying the composition to form a superficially dry solid, and calcining the dry solid at a temperature in a range from about 700° to about 1100° C. to form said crystalline material.

35. The process of making the crystalline material of claim 8, which comprises forming an aqueous composition comprising a source of erbium(III) ions, a source of alumina, and a source of boria, at a pH in a range from about 3 to about 9, drying the composition to form a superficially dry solid, and calcining the dry solid at a temperature in a range from about 700° to about 1100° C. to form said crystallinematerial.

36. The process of making the crystalline material of claim 9, which comprises forming an aqueous composition comprising a source of holmium(III) ions, a source of alumina, and a source of boria, at a pH in a range from about 3 to about 9, drying the composition to form a superficially dry solid, and calcining the dry solid at a temperature in a range from about 700° to about 1100° C. to form said crystalline material.

37. The process of making the crystalline material of claim 10, which comprises forming an aqueous composition comprising a source of yttrium(III) ions, a source of alumina, and a source of boria, at a pH in a range from about 3 to about 9, drying the composition to form a superficially dry solid, and calcining the dry solid at a temperature in a range from about 700° to about 1100° C. to form said crystalline material.

38. The process of making the crystalline material of claim 11 which comprises forming an aqueous composition comprising a source of dysprosium(III) ions, a source of alumina, and a source of boria, at a pH in a range from about 3 to about 9, drying the composition to form a superficially dry solid, and calcining the dry solid at a temperature in a range from about 700° to about 1100° C. to form said crystalline material.

39. The process of making the crystalline material of claim 12, which comprises forming an aqueous composition comprising a source of terbium(III) ions, a source of alumina, and a source of boria, at a pH in a range from about 3 to about 9, drying the mixture to form a superficially dry solid, and calcining the dry solid at a temperature in a range from about 700° to about 1100° C. to form said crystalline material.

40. The process of making the crystalline material of claim 13, which comprises forming an aqueous composition comprising a source of gadolinium(III) ions, a source of alumina, and a source of boria, at a pH in a range from about 3 to about 9, drying the composition to form a superficially dry solid, and calcining the dry solid at a temperature in a range from about 700° to about 1100° C. to form said crystalline material.

41. The process of making the crystalline material of claim 14, which comprises forming an aqueous composition comprising a source of europium(III) ions, a source of alumina, and a source of boria, at a pH in a range from about 3 to about 9, drying the composition to form a superficially dry solid, and calcining the dry solid at a temperature in a range from about 700° to about 1100° C. to form said crystalline material.

42. The process of making the crystalline material of claim 15, which comprises forming an aqueous composition comprising a source of samarium(III) ions, a source of alumina, and a source of boria, at a pH in a range from about 3 to about 9, drying the composition to form a superficially dry solid, and calcining the dry solid at a temperature in a range from about 700° to about 1100° C. to form said crystalline material.

43. The process of making the crystalline material of claim 16, which comprises forming an aqueous composition comprising a source of promethium(III) ions, a source of alumina, and a source of boria, at a pH in a range from about 3 to about 9, drying the composition to form a superficially dry solid, and calcining the dry solid at a temperature in a range from about 700° to about 1100° C. to form said crystalline material.

* * * * *